(12) United States Patent
Holz et al.

(10) Patent No.: US 11,493,930 B2
(45) Date of Patent: Nov. 8, 2022

(54) DETERMINING CHANGES IN MARKER SETUPS FOR ROBOT LOCALIZATION

(71) Applicant: Intrinsic Innovation LLC, Mountain View, CA (US)

(72) Inventors: Dirk Holz, Mountain View, CA (US); Elizabeth Murphy, San Jose, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 93 days.

(21) Appl. No.: 16/158,722

(22) Filed: Oct. 12, 2018

(65) Prior Publication Data

US 2020/0103915 A1 Apr. 2, 2020

Related U.S. Application Data

(60) Provisional application No. 62/739,014, filed on Sep. 28, 2018.

(51) Int. Cl.
*G05D 1/02* (2020.01)
*G01C 21/32* (2006.01)
(Continued)

(52) U.S. Cl.
CPC ........... *G05D 1/0234* (2013.01); *G01C 21/32* (2013.01); *G05D 1/0027* (2013.01);
(Continued)

(58) Field of Classification Search
CPC .. G05D 1/0234; G05D 1/0027; G05D 1/0088; G05D 2201/0216; G06F 16/29; G01C 21/32

See application file for complete search history.

(56) References Cited

U.S. PATENT DOCUMENTS 6,965,209 B2 11/2005 Jones et al.
9,152,149 B1 * 10/2015 Palamarchuk ....... G01C 21/206
(Continued)

FOREIGN PATENT DOCUMENTS

EP 1331537 7/2003
GB 2014020317 2/2014
WO WO-2019240208 A1 * 12/2019 ............... G05D 1/02

OTHER PUBLICATIONS

T. Bailey, Mobile Robot Localisation and Mapping in Extensive Outdoor Environments, Australian Centre for Field Robotics Department of Aerospace, Mechanical and Mechatronic Engineering, The University of Sydney Aug. 2002, Section 5.1 (pp. 106-113) (Year: 2002).*

(Continued)

*Primary Examiner* — Jelani A Smith
*Assistant Examiner* — Gabriel Anfinrud
(74) *Attorney, Agent, or Firm* — McDonnell Boehnen Hulbert & Berghoff LLP

(57) ABSTRACT

Embodiments are provided that include maintaining a map of a plurality of markers in an environment. The map includes a last detection time of each marker of the plurality of markers. The embodiments also include receiving a set of detected markers from a robotic device that is configured to localize in the environment using the plurality of markers. The embodiments further include updating, in the map, the last detection time of each marker which has a mapped position that corresponds to a detected position of a detected marker in the set of detected markers. The embodiments additionally include identifying, from the plurality of markers in the map, a marker having a last detection time older than a threshold amount of time. The embodiments still further include initiating an action related to the identified marker.

20 Claims, 13 Drawing Sheets

(51) Int. Cl.
G05D 1/00 (2006.01)
G06F 16/29 (2019.01)
(52) U.S. Cl.
CPC ........... *G05D 1/0088* (2013.01); *G06F 16/29* (2019.01); *G05D 2201/0216* (2013.01)

(56) References Cited

U.S. PATENT DOCUMENTS

| | | | |
|---|---|---|---|
| 9,250,081 B2* | 2/2016 | Gutmann | G01C 21/12 |
| 9,679,381 B2 | 6/2017 | Martini | |
| 2008/0262718 A1 | 10/2008 | Farwell | |
| 2010/0250366 A1* | 9/2010 | Smith | G01C 21/32 705/14.58 |
| 2011/0310087 A1 | 12/2011 | Wright, Jr. et al. | |
| 2012/0323431 A1 | 12/2012 | Wong et al. | |
| 2013/0138246 A1 | 5/2013 | Gutmann et al. | |
| 2014/0240501 A1 | 8/2014 | Newman et al. | |
| 2014/0241576 A1 | 8/2014 | Yu et al. | |
| 2015/0031390 A1 | 1/2015 | Robertson et al. | |
| 2015/0205299 A1* | 7/2015 | Schnittman | G05D 1/0242 701/26 |
| 2015/0304634 A1* | 10/2015 | Karvounis | G06K 9/6248 348/46 |
| 2017/0289749 A1* | 10/2017 | Brennan | H04W 4/30 |
| 2019/0329407 A1* | 10/2019 | Qi | G06T 7/73 |

OTHER PUBLICATIONS

K. Beevers, Mapping with Limited Sensing, Thesis, Rensselaer Polytechnic Institute, (pp. 36-38) (Year: 2007).*

T. Bailey, Mobile Robot Localisation and Mapping in Extensive Outdoor Environments, Australian Centre for Field Robotics Department of Aerospace, Mechanical and Mechatronic Engineering, The University of Sydney Aug. 2002, Section 5.1 (pp. 106-113) (Year: 2002).*

H. Durrant-Whyte and T. Bailey, "Simultaneous localization and mapping: part I," in IEEE Robotics & Automation Magazine, vol. 13, No. 2, pp. 99-110, Jun. 2006, doi: 10.1109/MRA.2006.1638022. (Year: 2006).*

T. Bailey and H. Durrant-Whyte, "Simultaneous localization and mapping (SLAM): part II," in IEEE Robotics & Automation Magazine, vol. 13, No. 3, pp. 108-117, Sep. 2006, doi: 10.1109/MRA.2006.1678144. (Year: 2006).*

Arya, S., D. M. Mount, N. S. Netanyahu, R. Silverman, and A. Y. Wu. An Optimal Algorithm for Approximate Nearest Neighbor Searching in Fixed Dimensions. Journal of the ACM, vol. 45, No. 6, pp. 891-923.

Besl, Paul J.; N.D. McKay (1992). "A Method for Regislialion of 3-D Shapes". IEEE Trans. on Pattern Analysis and Machine Intelligence. Los Alamitos, CA, USA: IEEE Computer Society. 14(2): 239-256.

Marius Muja and David G. Lowe, "Fast Approximate Nearest Neighbors with Automatic Algorithm Configuration", in International Conference on Computer Vision Theory and Applications (VISAPP'09), 2009.

Elseberg J, Magnenat S, Siegwart R and Nuechter A, "Comparison of nearest-neighbor-search strategies and implementations for efficient shape registration.", Journal of Software Engineering for Robotics (JOSER), 3(1), pp. 2-12. 2012.

A. V. Segal, D. Haehnel, and S. Thrun., "Generalized-ICP", In Robotics: Science and Systems, 2009.

* cited by examiner

DETERMINING CHANGES IN MARKER SETUPS FOR ROBOT LOCALIZATION

CROSS REFERENCE TO RELATED APPLICATION

The present application claims priority to U.S. Provisional patent application Ser. No. 62/739,014 filed on Sep. 28, 2018, the entire contents of which is incorporated herein by reference, as if fully set forth in this description.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices ("robots") guided by computer control systems. The computer control systems may localize the one or more robots in relation to markers distributed throughout the warehouse. Localizing the robots may allow the computer control systems to navigate the one or more robots through the warehouse.

SUMMARY

In one example, a method is provided. The method includes maintaining a map of a plurality of markers in an environment. The map includes a last detection time of each marker of the plurality of markers. The method also includes receiving a set of detected markers from a robotic device that is configured to localize in the environment using the plurality of markers. The method further includes updating, in the map, the last detection time of each marker which has a mapped position that corresponds to a detected position of a detected marker in the set of detected markers. The method additionally includes identifying, from the plurality of markers in the map, a marker having a last detection time older than a threshold amount of time. The method still further includes initiating an action related to the identified marker.

In another example, a computing device is provided. The computing device includes at least one processor. The computing device is configured to maintain a map of a plurality of markers in an environment. The map includes a last detection time of each marker of the plurality of markers. The computing device is also configured to receive a set of detected markers from a robotic device that is configured to localize in the environment using the plurality of markers. The computing device is further configured to update, in the map, the last detection time of each marker which has a mapped position that corresponds to a detected position of a detected marker in the set of detected markers. The computing device is additionally configured to identify, from the plurality of markers in the map, a marker having a last detection time older than a threshold amount of time. The computing device is still further configured to initiate an action related to the identified marker.

In a further example, a non-transitory computer readable medium is provided. The non-transitory computer readable medium has stored therein program instructions executable by a computing system to cause the computing system to perform operations. The operations include maintaining a map of a plurality of markers in an environment. The map includes a last detection time of each marker of the plurality of markers. The operations also include receiving a set of detected markers from a robotic device that is configured to localize in the environment using the plurality of markers. The operations further include updating, in the map, the last detection time of each marker which has a mapped position that corresponds to a detected position of a detected marker in the set of detected markers. The operations additionally include identifying, from the plurality of markers in the map, a marker having a last detection time older than a threshold amount of time. The operations still further include initiating an action related to the identified marker.

In another example, a system is provided that includes means for maintaining a map of a plurality of markers in an environment. The map includes a last detection time of each marker of the plurality of markers. The system also includes means for receiving a set of detected markers from a robotic device that is configured to localize in the environment using the plurality of markers. The system further includes means for updating, in the map, the last detection time of each marker which has a mapped position that corresponds to a detected position of a detected marker in the set of detected markers. The system additionally includes means for identifying, from the plurality of markers in the map, a marker having a last detection time older than a threshold amount of time. The system still further includes means for initiating an action related to the identified marker.

In an additional example, a method is provided that includes maintaining a map of a plurality of markers in an environment, where the map is used by a robotic device to localize itself within an environment. The method further includes receiving a set of detections from the robotic device. The method additionally includes determining, from the set of detections, an unmapped detection. In response to determining the unmapped detection, the method further includes, requesting, by way of a graphical user interface, user input to label the unmapped detection as either a confirmed marker or a negative region. The method additionally includes updating the map used by the robotic device based on the user input.

In another example, a computing device is provided. The computing device includes at least one processor. The computing device is configured to maintain a map of a plurality of markers in an environment, where the map is used by a robotic device to localize itself within an environment. The computing device is further configured to receive a set of detections from the robotic device. The computing device is additionally configured to determine, from the set of detections, an unmapped detection. In response to determining the unmapped detection, the computing device is further configured to request, by way of a graphical user interface, user input to label the unmapped detection as either a confirmed marker or a negative region. The computing device is additionally configured to update the map used by the robotic device based on the user input.

In a further example, a non-transitory computer readable medium is provided. The non-transitory computer readable medium has stored therein program instructions executable by a computing system to cause the computing system to perform operations. The operations include maintaining a map of a plurality of markers in an environment, where the map is used by a robotic device to localize itself within an environment. The operations further include receiving a set of detections from the robotic device. The operations additionally include determining, from the set of detections, an unmapped detection. In response to determining the unmapped detection, the operations further include, requesting, by way of a graphical user interface, user input to label the unmapped detection as either a confirmed marker or a negative region. The operations additionally include updating the map used by the robotic device based on the user input.

In another example, a system is provided that includes means for maintaining a map of a plurality of markers in an environment, where the map is used by a robotic device to localize itself within an environment. The system further includes means for receiving a set of detections from the robotic device. The system additionally includes means for determining, from the set of detections, an unmapped detection. In response to determining the unmapped detection, the system further includes means for requesting, by way of a graphical user interface, user input to label the unmapped detection as either a confirmed marker or a negative region. The system additionally includes means for updating the map used by the robotic device based on the user input.

In a further example, a method is provided that includes maintaining a map of a plurality of markers in an environment. The method further includes causing a robotic device to run a localization process during each scan window of a sequence of scan windows, where each run of the localization process generates a set of markers detected by the robotic device more frequently than a threshold detection rate during a corresponding scan window of the sequence of scan windows. Based on the set of markers detected by the robotic device during at least one scan window of the sequence of scan windows, the method further includes identifying a marker change in the environment from the map of the plurality of markers. In response to identifying the marker change, the method further includes initiating an action.

In a further example, a computing device is provided. The computing device includes at least one processor. The computing device is configured to maintain a map of a plurality of markers in an environment. The computing devices is further configured to cause a robotic device to run a localization process during each scan window of a sequence of scan windows, where each run of the localization process generates a set of markers detected by the robotic device more frequently than a threshold detection rate during a corresponding scan window of the sequence of scan windows. Based on the set of markers detected by the robotic device during at least one scan window of the sequence of scan windows, the computing device is further configured to identifying a marker change in the environment from the map of the plurality of markers. In response to identifying the marker change, the computing device is further configured to initiate an action.

In a further example, a non-transitory computer readable medium is provided. The non-transitory computer readable medium has stored therein program instructions executable by a computing system to cause the computing system to perform operations. The operations include maintaining a map of a plurality of markers in an environment. The operations further include causing a robotic device to run a localization process during each scan window of a sequence of scan windows, where each run of the localization process generates a set of markers detected by the robotic device more frequently than a threshold detection rate during a corresponding scan window of the sequence of scan windows. Based on the set of markers detected by the robotic device during at least one scan window of the sequence of scan windows, the operations further include identifying a marker change in the environment from the map of the plurality of markers. In response to identifying the marker change, the operations further include initiating an action.

In another example, a system is provided that includes means for maintaining a map of a plurality of markers in an environment. The system further includes means for causing a robotic device to run a localization process during each scan window of a sequence of scan windows, where each run of the localization process generates a set of markers detected by the robotic device more frequently than a threshold detection rate during a corresponding scan window of the sequence of scan windows. Based on the set of markers detected by the robotic device during at least one scan window of the sequence of scan windows, the system further includes means for identifying a marker change in the environment from the map of the plurality of markers. In response to identifying the marker change, the system further includes means for initiating an action.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
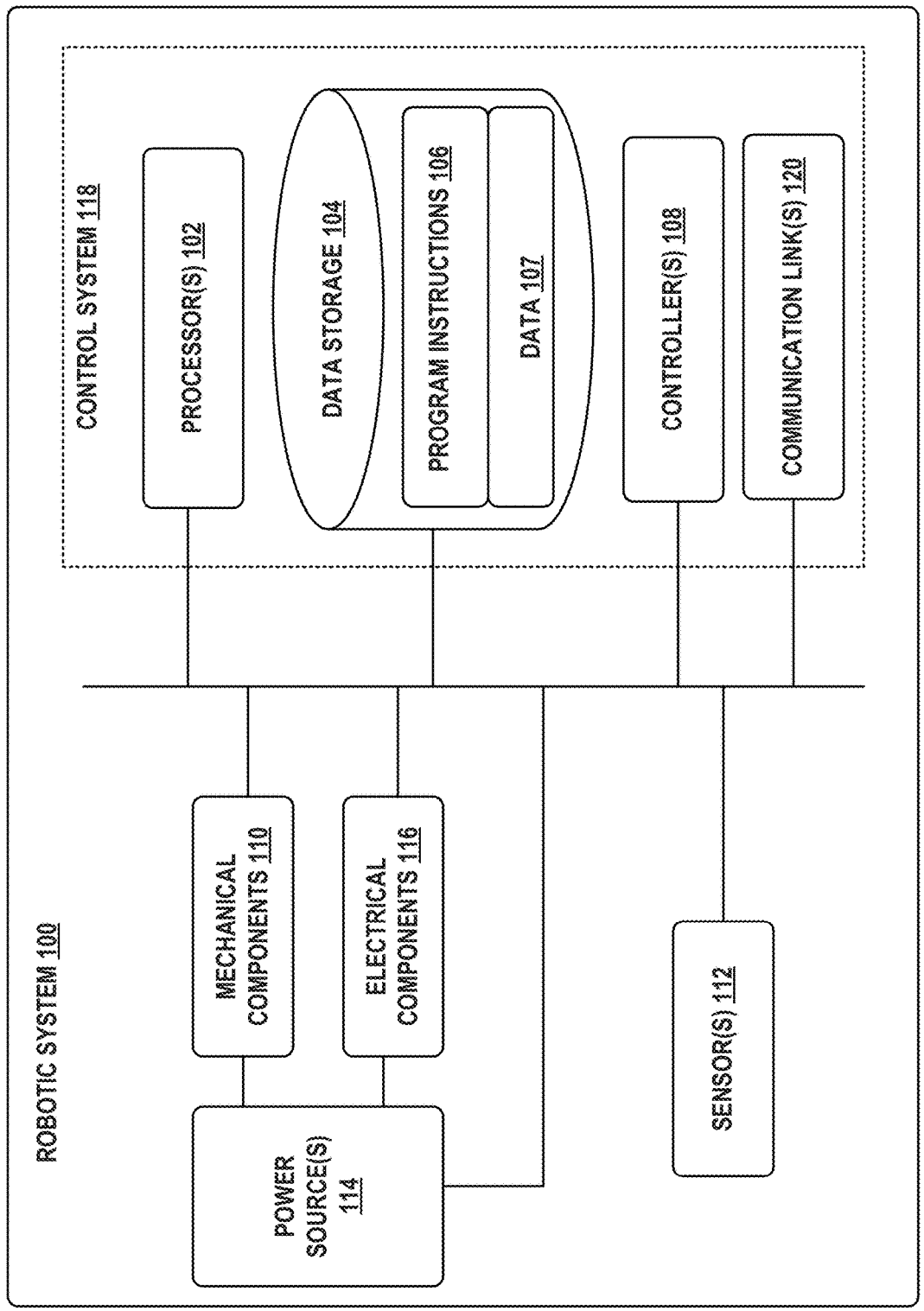
FIG. 1 illustrates a block diagram of a robotic system, in accordance with an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

In warehouse installations with Automated Guided Vehicles (AGVs), localization of the vehicles, e.g., determining their position and orientation in the warehouse, is often done with artificial landmarks such as retroreflective markers. Sensors on-board the vehicles may be used to detect such markers and localize in a known marker setup of the warehouse. Such a marker setup may be achieved by planning the layout of artificial landmarks and installing markers as indicated by the planned layout. Subsequently, a map of the markers may be generated by surveying the positions of the landmarks or automatically building a map of the setup (e.g., by having one or more robots run a simultaneous localization and mapping or SLAM process). Once installed, such a setup is typically considered static, meaning that the number and placement of markers does not change. In some cases, the setup may be changed by re-planning the layout and removing, moving, or adding markers, followed by re-surveying or re-mapping. However, during robot operation, changes to the marker setup are typically not detected and require human operators to regularly check that all markers are still present at the correct expected locations.

Example methods and processes disclosed herein involve using marker detections from the robots to constantly update the marker setup. In particular, a robot may periodically report sets of detected markers. A map of the markers that includes a last detection time of each of the markers may be maintained, e.g., by a central server. Each time a robot reports a marker as being detected at its expected location, the last detection time of the marker may be updated in the map. The server may monitor the last detection times of each of the markers in order to automatically flag when a marker has not been detected in a while, which may indicate that the marker fell down or got occluded. The server may then trigger an action related to the undetected marker. For instance, a human operator may be signalled via a graphical user interface to check and correct the marker. In other examples, a robot may be deployed to the area to investigate, e.g., by searching for the marker or automatically replacing the marker with a new marker.

In some examples, a marker may be flagged when the marker has a last detection time in the map that is older than a threshold amount of time. For instance, the threshold amount of time may be one hour, one day, or one week. In some examples, the threshold amount of time may be varied for different areas depending on the level of robot activity in the area. In particular, areas with less robot activity (e.g., fewer robots traversing the area) may be allowed a higher threshold. In further examples, before flagging a marker, a level of robot activity in the area may be verified (e.g., at least one robot or at least a certain number of robots have traversed an area proximate to the mapped location of the marker since the last detection time of the marker).

In additional examples, marker detections from the robots may also be used to automatically add new markers to the setup. Notably, in some examples, marker additions may be automated in addition to flagging undetected markers. In other examples, marker additions may be automated instead of flagging undetected markers. In order to automate marker additions to the map, when a robot or a threshold number of robots report a detected marker that is not included in the setup, the detected marker gets added to the map as a candidate marker. The candidate marker may be flagged in a graphical user interface displayed to a human operator. The operator can then accept such a candidate via the interface, which may cause the candidate to get added to the marker setup and subsequently used by vehicles to localize. The candidate marker may also be flagged as a negative marker via the interface, indicating that the marker reported by the vehicle(s) does not correspond to a real physical marker in the warehouse. Instead, the marker may correspond to a region causing false detections, such as a semi-reflective wall in a setup where retroreflective markers are used. Negative markers may serve two purposes. First, the graphical user interface may be programmed to prevent future reporting of candidate markers at or near that location. Second, additional information may be provided to the vehicles that this area may cause false detections in order to improve vehicle localization.

Some example implementations may involve three components: software running on the vehicles, centrally run fleet management software, and an operator-facing graphical user interface.

On the vehicles, during localization, software may be run to create local maps of detected markers. The local maps may periodically be sent from the vehicles to a central fleet coordination software component. The local maps may be built using an efficient real-time pose graph optimization and bundle adjustment method. Local maps may be filtered by the robots to only report stable detections of markers. In particular, only markers detected above a threshold detection rate over a scan window may be reported by the vehicles. Local filtering at the robot level may improve the accuracy and efficiency of flagging missing or added markers at the central server level. In some examples, the vehicles may be controlled to periodically reset their local marker maps (e.g., every five minutes) to ensure that missing or added markers are flagged promptly.

On the fleet management side, a central server may run a software component with access to the marker setup of the warehouse in order to collect the sets of markers reported by vehicles and perform updates to a central map. In particular, the server may match local maps of detected markers built by vehicles against the known marker setup in order to update the last detection time of known markers and/or to add candidate markers to the map.

An operator-facing graphical user interface may give operators access to the marker setup including the markers currently used by the robots for localization, available candidate markers, and identified negative markers. Operators can turn candidate markers into markers subsequently used by vehicles to localize or into known negative markers. In addition, operators may be informed about markers that have not been detected in a certain amount of time using customized alarms.

In addition to determining when a marker was last detected and/or adding new markers that got detected, the local maps received from the robots may also allow for detecting changes in the position and/or orientation of a marker. For instance, when multiple vehicles detect a marker at a slightly different location, the system may inform operators to check the installment of the marker and/or allow operators to accept the changes in position and orientation via a user interface (e.g., to refine the mapped marker location over time).

Referring now to the Figures, FIG. 1 illustrates an example configuration of a robotic system that may be used in connection with the embodiments described herein. Robotic system 100 may be configured to operate autonomously, semi-autonomously, or using directions provided by user(s). Robotic system 100 may be a vehicle implemented in various forms, such as forklifts, pallet jacks, AGVs, cars, or trucks. Other forms are possible as well. Furthermore, robotic system 100 may also be referred to as a robot, robotic device, mobile robot, or robotic vehicle, among other designations.

As shown in FIG. 1, robotic system 100 may include processor(s) 102, data storage 104, and controller(s) 108, which together may be part of a control system 118. Robotic system 100 may also include sensor(s) 112, power source(s) 114, mechanical components 110, electrical components 116, and communication link(s) 120. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, electrical components 116, or communication link(s) 120.

Data storage 104 may be one or more types of hardware memory. For example, data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, data storage 104 can be a single physical device. In other embodiments, data storage 104 can be implemented using two or more physical devices, which may communicate with one another via wired or wireless communication. As noted previously, data storage 104 may include computer-readable program instructions 106 and data 107. Data 107 may be any type of data, such as configuration data, sensor data, and/or diagnostic data, among other possibilities.

Controller 108 may include one or more electrical circuits, units of digital logic, computer chips, and/or microprocessors that are configured to (perhaps among other tasks) interface between any combination of mechanical components 110, sensor(s) 112, power source(s) 114, electrical components 116, control system 118, communication link(s) 120, or users of robotic system 100. In some embodiments, controller 108 may be a purpose-built embedded device for performing specific operations with one or more subsystems of robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. For instance, control system 118 may include various components for communicating with robotic system 100, including a joystick, buttons, and/or ports, etc. The example interfaces and communications noted above may be implemented via a wired or wireless connection, or both. Control system 118 may perform other operations for robotic system 100 as well.

In some implementations, control system 118 of robotic system 100 may also include communication link(s) 120 configured to send and receive information. Communication link(s) 120 may transmit data indicating the state of the various components of robotic system 100. For example, information read by sensor(s) 112 may be transmitted via communication link(s) 120 to a separate device. Other diagnostic information indicating the integrity or health of power source(s) 114, mechanical components 110, electrical components 116, processor(s) 102, data storage 104, or controller 108 may be transmitted via communication link(s) 120 to an external communication device.

In some implementations, robotic system 100 may receive information at communication link(s) 120 that is then processed by processor(s) 102. The received information may indicate data that is accessible by processor(s) 102 during execution of program instructions 106. Further, the received information may change aspects of controller(s) 108 that may affect the behavior of mechanical components 110 or electrical components 116. In some cases, the received information may indicate a query requesting a piece of information (e.g. the operational state of one or more of the components of robotic system 100). Processor(s) 102 may subsequently transmit the piece of information back out via communication link(s) 120.

In some cases, communication link(s) 120 may include a wired connection. Robotic system 100 may include one or more ports to interface communication link(s) 120 to an external device. Communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, control system 118 may communicate with other systems of robotic system 100 via wired or wireless connections, and may further be configured to communicate with one or more users or operators of the vehicle. As one possible illustration, control system 118 may receive an input (e.g., from a central control system, from a user, or from another vehicle) indicating an instruction to move a pallet from a first location of a warehouse to a second location of the warehouse. The input to control system 118 may be received via communication link(s) 120.

Based on this input, control system 118 may perform operations to cause robotic system 100 to use sensors 112 to analyze the environment of the warehouse to locate the pallet and subsequently use mechanical components 110 to pick up and move the pallet.

Operations of control system 118 may be carried out by processor(s) 102. Alternatively, these operations may be carried out by controller 108, or a combination of processor(s) 102 and controller 108. In some embodiments, control system 118 may partially or wholly reside on a device other than robotic system 100, and therefore may at least in part control robotic system 100 remotely. Communication link(s) 120 may be used at least in part to carry out the remote communication.

Mechanical components 110 represent hardware of robotic system 100 that may enable robotic system 100 to perform physical operations. As a few examples, robotic system 100 may include physical members such robotic arm(s), wheel(s), track(s), linkage(s), and/or end effector(s). The physical members or other parts of robotic system 100 may further include motors and actuators arranged to move the physical members in relation to one another. Robotic system 100 may also include one or more structured bodies for housing control system 118 or other components, and may further include other types of mechanical components. Mechanical components 110 used in a given robot may vary based on the design of the robot, and may also be based on the operations and/or tasks the robot may be configured to perform.

In some examples, mechanical components 110 may include one or more removable components. Robotic system 100 may be configured to add and/or remove such removable components, which may involve assistance from a user and/or another robot. For example, robotic system 100 may be configured with removable arms, linkages, and/or end effectors so that these members can be replaced or changed as needed or desired based on a task robotic system 100 is expected or planned to perform. In some embodiments, robotic system 100 may include one or more removable and/or replaceable battery units or sensors. Other types of removable components may be included within some embodiments.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras (e.g., a depth camera and/or a stereo camera), among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment, location and/or identity of nearby objects (e.g., pallets, environmental landmarks), which may assist with environment recognition and navigation. In an example configuration, sensor(s) 112 may include RADAR (e.g., for long-range object detection, distance determination, and/or speed determination), LIDAR (e.g., for reflector detection, short-range object detection, distance determination, and/or speed determination), SONAR (e.g., for underwater object detection, distance determination, and/or speed determination), VICON® (e.g., for motion capture), one or more cameras (e.g., stereoscopic cameras for three-dimensional (3D) vision), a global positioning system (GPS) transceiver, and/or other sensors for capturing information of the environment in which robotic system 100 is operating. Sensor(s) 112 may monitor the environment in real time, and detect obstacles, elements of the terrain, weather conditions, temperature, and/or other aspects of the environment.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such the operation of wheels, linkages, actuators, end effectors, and/or other mechanical and/or electrical features of robotic system 100. The data provided by sensor(s) 112 may enable control system 118 to determine errors in operation as well as monitor overall operation of components of robotic system 100.

Sensor(s) 112 may include one or more velocity and/or acceleration sensors. Sensor(s) 112 may measure both linear and angular velocity and/or acceleration. For instance, sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicated discussed herein. Additionally or alternatively, robotic system 100 may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, and/or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Power source(s) 114 may charge using various types of charging, such as wired connections to an outside power source, wireless charging, combustion, or other examples.

Electrical components 116 may include various mechanisms capable of processing, transferring, and/or providing electrical charge or electric signals. Among possible examples, electrical components 116 may include electrical wires, circuitry, and/or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to mechanical components 110, for example. Further, robotic system 100 may include electric motors. Other examples of electrical components 116 may exist as well.

Although not shown in FIG. 1, robotic system 100 may include a chassis and/or an operator cabin, which may connect to or house components of robotic system 100. The structure of the chassis and/or cabin may vary within examples and may further depend on operations that a given vehicle may have been designed to perform. For example, a vehicle developed to carry large, heavy loads may have a wide, rigid chassis that enables placement of the load. Similarly, a vehicle designed to carry light loads at high speeds may have a narrow, small chassis that does not have substantial weight. Further, the chassis, cabin, and/or the other components may be developed using various types of materials, such as metals or plastics. Within other examples, a vehicle may have a chassis with a different structure or made of various types of materials.

The chassis, cabin, and/or the other components may include or carry sensor(s) 112. These sensors may be positioned in various locations on robotic system 100, such as on top of the chassis to provide a high vantage point for sensor(s) 112.

Robotic system 100 may carry a load, such as a type of cargo that is to be transported. The load may also represent external batteries or other types of power sources (e.g., solar panels) that robotic system 100 may utilize. Carrying the load represents one example use for which robotic system 100 may be configured, but robotic system 100 may be configured to perform other operations as well.

Figure 2:
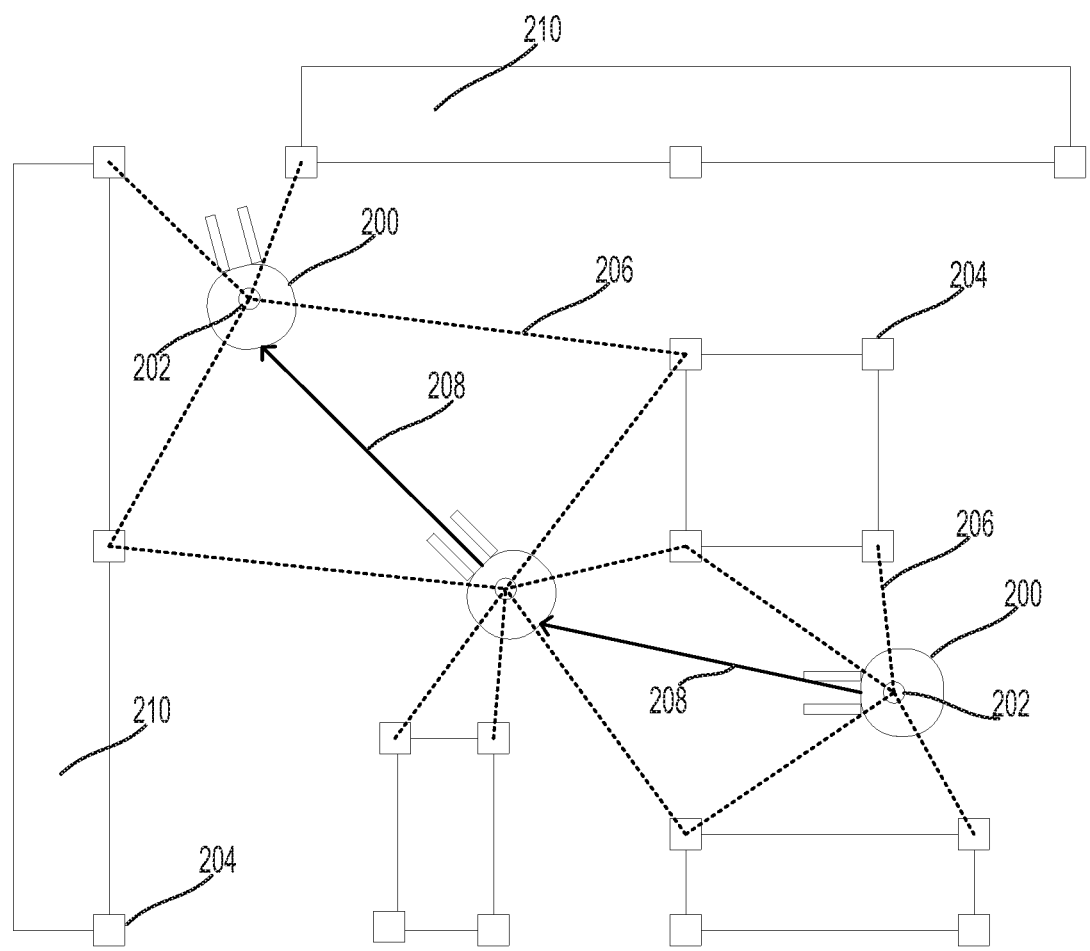
FIG. 2 shows a robot navigating within an environment, in accordance with an example embodiment.

FIG. 2 shows a robot navigating within an environment, in accordance with example embodiments. A location and orientation of a robot 200 may be estimated, and the robot may navigate through the environment accordingly. The location and orientation of the robot may be referred to as the "pose" of the robot. The pose of the robot may be estimated based on received signals 206 by one or more sensors 202 of the robot. The received signals may be associated with landmarks 204 distributed throughout the environment. For example, the signals may be reflected by retroreflective markers placed in various locations along a substantially horizontal plane in a warehouse. In this example, the robot may include a light ranging and detection (LIDAR) unit that emits light to an area surrounding the robot, and retroreflectors positioned in the area surrounding the robot may reflect the light back to the robot for detection by one or more sensors of the robot.

In some examples, the received signals may indicate locations of the landmarks relative to the robot. Further, the locations of the landmarks within the environment may be mapped. Matching the received signals with corresponding mapped landmarks may thus allow the pose of the robot within the environment to be inferred. For example, the robot may align detected landmarks with the mapped landmarks to determine its position on the map. Further, information about reflectors (e.g., position information) may be updated in the map as part of a simultaneous localization and mapping or SLAM procedure. Additionally, the locations of the landmarks in relation to obstacles 210 within the environment may also be mapped in the same or a different map. For example, the locations of physical surfaces in the environment may be represented as an occupancy grid of occupied voxels, where the occupancy grid is aligned with the map of landmarks. The robot may make movements 208 to navigate within the environment while avoiding the obstacles based on the estimated pose of the robot and the mapped locations of the obstacles.

Figure 3:
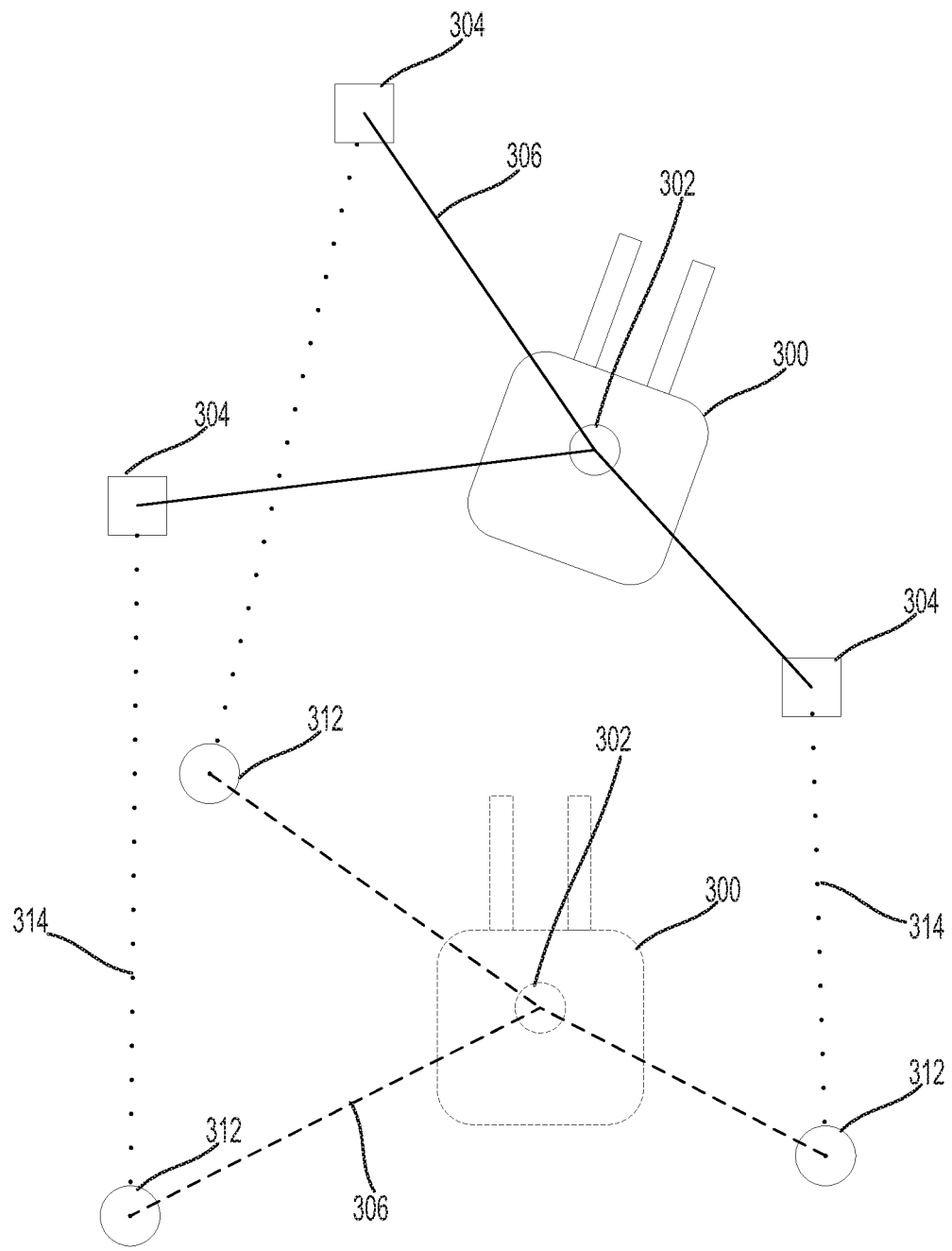
FIG. 3 shows a robot associating detections with mapped landmarks, in accordance with an example embodiment.

FIG. 3 shows a robot associating detections with mapped landmarks, in accordance with example embodiments. Detected signals 306 from detected landmarks 312 may be received by one or more sensors 302 of a robot 300. The signals may be indicative of locations of the detected landmarks in relation to the robot. The detected landmarks may be transformed to align with mapped landmarks 304. Associations 314 may be formed between the detected landmarks and the mapped landmarks that result in a minimal distance between the transformed detected landmarks and the mapped landmarks. For example, a transformation based on the associations 314 may be determined using a least means squared method such as an iterative closest point (ICP) method. The detected landmarks may be translated and rotated based on the associations 314 between the detected landmarks and the mapped landmarks. The pose of the robot may be inferred by similarly translating and rotating the robot.

Figure 4:
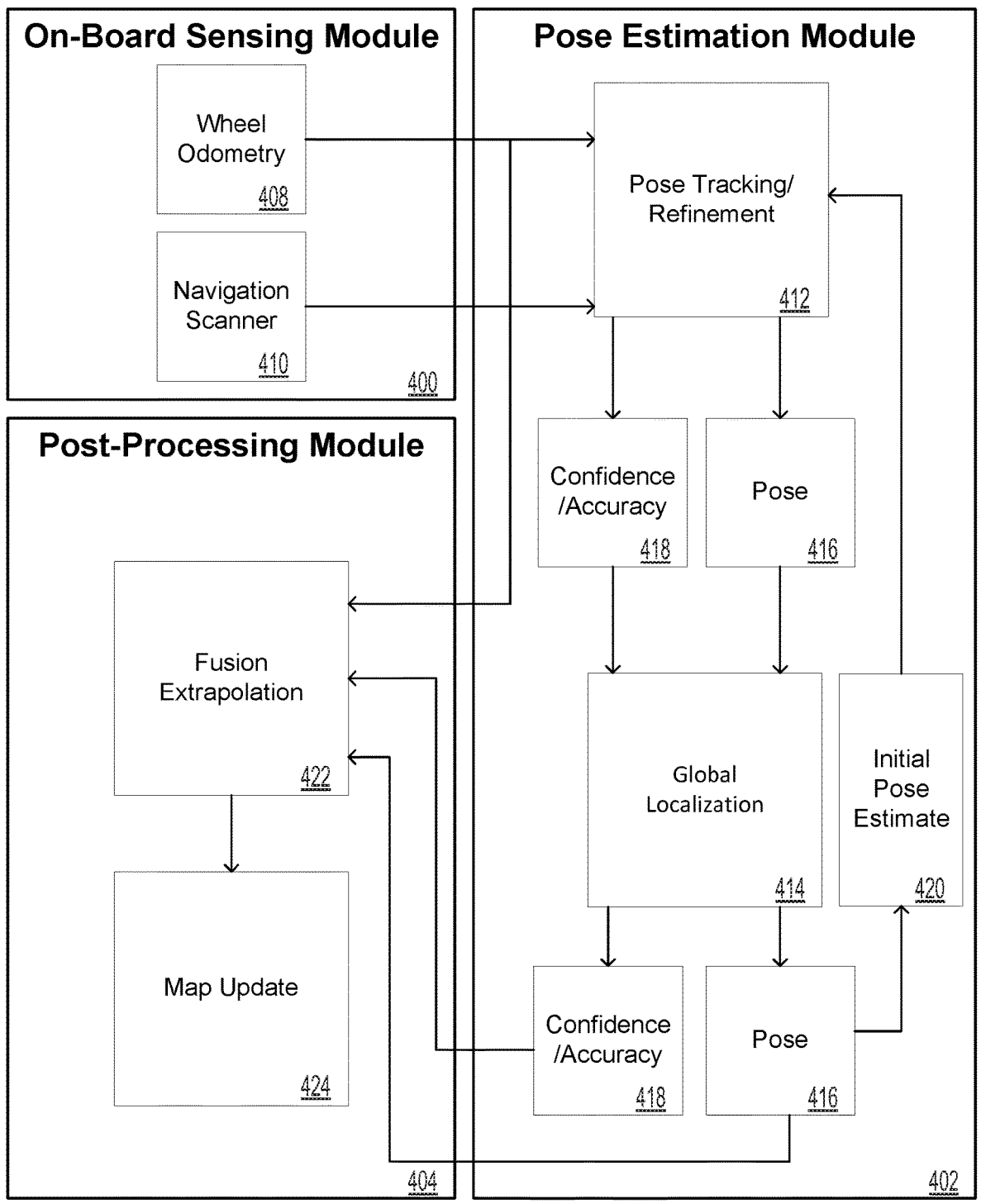
FIG. 4 is a functional block diagram illustrating modules of a robot control system, in accordance with an example embodiment.

FIG. 4 is a functional block diagram illustrating modules of a robot control system, in accordance with example embodiments. The robot control system may include one or more sensors as part of an on-board sensing module 400. The sensors may provide data that is indicative of wheel odometry 408 of the robot. The sensors may also include a navigation scanner 410. The navigation scanner 410 may be configured to receive signals from landmarks in an environment of the robot.

A pose estimation module 402 of the robot control system may indicate the location and orientation of the robot with respect to mapped landmarks in the environment. The pose estimation module 402 may include software that performs functions based on inputs from the on-board sensing module 400. For example, each time the navigation scanner 410 performs a scan, sensor data from the on-board sensing module may be processed by the pose estimation module 402 to determine a current location and orientation of the robot in the environment. The pose tracking/refinement block 412 and global localization block 414 of the pose estimation module 402 represent processing steps, while the pose block 416, confidence/accuracy block 418, and initial pose estimate block 420 represent outputs of the processing blocks 412 and 414.

The pose estimation module 402 may operate in two modes. In a first mode, the pose estimation module 402 may have an initial pose estimate 420 of the robot, and the pose tracking/estimate block 412 may update the initial pose estimate 420. The pose tracking/refinement block 412 may utilize the wheel odometry 408 and data from the navigation scanner 410 in conjunction with the initial pose estimate 420 to identify the location of the robot in relation to detected landmarks. The pose tracking/refinement block 412 may associate the detected landmarks to particular mapped landmarks that are near to the initial pose estimate 420. The pose estimation module 402 may further provide a pose estimate 416 based on the association, and a confidence/accuracy 418 of the pose estimate. The confidence/accuracy 418 may indicate that the initial pose estimate is adequate, or that it requires further refinement. Also in the first mode, the pose 416 and confidence/accuracy 418 determined by the pose tracking/refinement block 412 may be used in the post-processing module 404 to determine a refined pose estimate of the robot. Meanwhile, the global localization block 414 may be skipped. Further, the pose estimate 416 derived during pose tracking/refinement 412 may be treated as the initial pose estimate 420 of the robot for use in subsequent pose estimations.

In a second mode, the pose estimation module 402 may have no initial indication of where the robot is within the environment. In other words, the initial pose estimate 420 may not yet be determined. In the second mode, the pose estimation module 402 may utilize global localization 414 rather than pose tracking/refinement 412 to determine the pose of the robot. The global localization block 414 may test associations between the detected landmarks and mapped landmarks across the entire environment of the robot. The global localization block 414 may also output a pose estimate 416 and confidence/accuracy 418. Also in the second mode, the pose 416 and confidence/accuracy 418 determined by the global localization block 414 may be used in the post-processing module 404 to determine a refined pose estimate of the robot. Further, the pose estimate 416 derived during global localization 414 may be treated as the initial pose estimate 420 of the robot for use in subsequent pose estimations.

A post-processing module 404 may be used to refine the pose estimation derived from the pose tracking/refinement or global localization. The post-processing module 404 may perform fusion extrapolation 422 of the pose estimate and confidence/accuracy of the localization module, and wheel odometry of the on-board sensing module. During fusion extrapolation, the refined pose estimate may rely more on the estimated pose provided by the localization module when there is a high confidence/accuracy. Conversely, the refined pose estimate may rely more on the wheel odometry when there is a low confidence/accuracy. Further, the post-processing module 404 may provide a map update 424 based on the provided confidence/accuracy and refined pose estimate. For example, the map update 424 may update locations of the mapped landmarks based on the refined pose estimate. In other examples, the map update may update statistical information associated with the mapped landmarks used to generate the refined pose estimation.

Each of the functions performed by the robot control system of FIG. 4 may be performed periodically. For example, navigation scanner 410 may perform scans at 8 Hz, while the wheel odometry 408 may update at 100 Hz. As another example, the processing blocks 412 and 414 of the pose estimation module may receive data from the on-board sensing module at 8 Hz, and may produce poses 416 and confidence/accuracies 418 at 8 Hz. Different frequencies are possible as well.

A computing system may perform SLAM or similar processes to determine a location of the robot while also detecting positions of markers within the environment. For example, the computing system may detect markers based on the intensity of measurements within laser scans and may match observed markers from different sets of measurements.

Potential errors can arise when attempting to associate detected markers across different scans, such as failures that result from a lack of enough detected markers or wrong associations between detected markers. A computing system may overcome these and other potential errors using a nearest neighbor approach that may associate each detected marker to the closest marker that has been detected multiple times. Particularly, the nearest neighbor approach may involve determining the nearest marker using a Euclidean distance or other distance determinations (e.g., Mahalanobis distance). In some instances, the computing system may also be configured to utilize a validation gate to determine when a marker has previously been observed or when the marker should be added as a newly detected landmark. The results of the data association between detected markers can enable the computing system to estimate a current pose of the robot within the environment.

The computing system may use control instructions from the robot's control system when estimating its current pose. For instance, odometry data provided from sensors positioned on wheels of the robot may be used to estimate changes in the current pose of the robot. As an example, a robot may have an initial 2D position (x,y) with initial orientation $\Theta$. After changing position by ($\Delta x$, $\Delta y$) and changing orientation by ($\Delta\Theta$) as indicated by the controls applied by the control system, the updated pose of the robot is (x+$\Delta x$, y+$\Delta y$) with updated orientation ($\Theta+\Delta\Theta$). The computing system may further refine the estimated pose using the detected markers within incoming sensor scans.

The computing system may also estimate the current pose of a sensor (or the robot) using detected markers and other measurements of the environment (e.g., contour measurements representing distances to nearby surfaces). When the prior pose of the robot is known, the computing system may use the recent pose estimation to predict where markers should be located based on prior detection of markers. The computing system may continue to monitor changes in the robot's pose using subsequent measurements.

In some instances, the computing system may modify an uncertainty associated with each observed marker to reflect recent changes based on new measurements, and may also add newly detected markers to the map of markers in the environment. The computing system may perform SLAM iteratively to continuously update the map of markers in the space enabling the robot to map the environment while also navigating safely.

In further examples, a computing system may perform a modified SLAM process that uses one or more operations, such as initial pose monitoring, local window optimization, global optimization, and complete bundle adjustment. The computing system can often refrain from subsequent operations after the initial pose estimation. In effect, the computing system may determine whether or not to perform the next, computationally more expensive operation during performance of the preceding operation.

The computing system may add an initial scan of the environment to an underlying pose graph that represents a series of poses of the robot. The initial scan may be assigned as pose (0) to form the basis of a map's coordinate frame. Thereafter, for every subsequent scan of the environment, the computing system may refer to the prior node added in the graph (e.g., pose (0)) and update the current pose accordingly. In some instances, the computing system may update the pose using a registration process (e.g., an Iterative Closest Point (ICP) algorithm)) for marker-based localization and the Euclidean point-to-point distance between pairs of matching marker detections $d_i$ and mapped landmarks $m_j$ as shown in the transform of equation [1]:

$$T^* = \mathrm{argmin} \sum_i \sum_j w_{ij} \|m_j - T(d_i)\|^2 \quad [1]$$

Equation [1] may be used to determine an error for a single link in a pose graph. In other words, a computing system may use equation [1] to determine if an error exists between two different poses. As such, a pose graph may include numerous links producing an optimization problem for reducing error. Equation [1] may assume constant weights of $w_{ij}=1$ for matches. In some instances, however, the computing system may be configured to apply non-constant weights to give a higher influence to markers detected closer to the robot or to detected markers that have been deemed stable by the computing system. The computing system may also factor in detection rates of the markers and use a different error function, such as covariance-to-covariance metrics as in a generalized registration process (e.g., ICP). For every pair of matches between markers, the computing system can optimize the whole pose graph (or a partial graph) to solve individual ICP problems between two nodes simultaneously.

In some cases, matching of laser scans and marker detections within the scans may result in slight errors and inaccuracies. As such, local window optimization may overcome unwanted effects by refining the estimated pose via a pose graph optimization in a local window. Particularly, the computing system may optimize the estimated pose while keeping prior poses of neighboring nodes constant in the pose graph and limiting the use of older pose estimates that are outside the local window. For example, when scans only produce a few detected markers nearby the robot, the computing system may utilize local window optimization to improve the pose estimate.

The computing system may add a new node to a pose graph when the robot travels a distance or turns an angle between scans of the environment that exceed a maximum distance or a maximum turn angle. Particularly, the computing system may add the current scan to the underlying pose graph as the new reference scan that can be used for subsequent pose determinations.

The computing system may further determine a local neighborhood of other nodes in the pose graph and optimize the resulting sub-graph (e.g., the local neighborhood of nodes) to refine the estimate of the robot's current pose as well the other poses represented by the nodes in the local window. The computing system may keep nodes that connect the sub-graph to the rest of the pose graph constant and optimize all other poses within the sub-graph to refine the current pose while factoring in new scans (e.g., information that has not been available when initially computing the respective poses).

The computing system may also perform loop detection and verification. For instance, if the local window contains graph nodes created during a previous pass through that area of the environment, the computing system may trigger a global optimization of the pose graph using the prior scans of the area. Global optimization may optimize all nodes in a pose graph representing changes in the robot's pose and enable building a map of marker positions. The computing system may add an edge with both poses to the graph when a marker is detected from two poses/nodes. By changing the two poses, the computing system may minimize the distances between the two points and obtain new robot poses. The computing system may go through all nodes and extract all marker detections in the world frame to obtain a map.

During global optimization, the computing system may match marker detections (or match contour scans of the environment) to form blocks within a large optimization problem that requires all poses in the graph to be optimized in order to minimize the differences between all found matches of markers detected within different scans of the environment. The computing system may match and optimize the pose graph in a repeated process until the global system converges to produce accurate pose estimations of the robot.

To account for noise and obtain a more accurate map of marker positions, the computing system may perform a final complete adjustment to optimize both the path of the robot and the map of marker positions. The computing system may optimize poses in the graph together with respective scans to build a new map of markers and may further correct measurement errors and other inaccuracies by refining the positions of mapped reflectors during bundle adjustment. Particularly, in some instances, aggregated marker detections may match very well in the pair-wise formulation of the global graph optimization, but may not accurately represent the actual positions of markers in the environment. Therefore, the computing system may use complete bundle adjustment to improve the accuracy of individual marker positions in the map of marker positions.

The computing system may continue to update the map of marker positions by aggregating marker detections of aligned scans. For each detected marker, the computing system may check to see if the detected marker matches a marker already added to the map, which may involve using a nearest neighbor search with a maximum distance corresponding to the expected inter-marker distance (e.g., using a 0.5 meter distance threshold) to identify matches between markers detected within multiple scans of the environment. If the computing system finds that a detected marker matches a marker positioned in the map, the computing system may adjust the position of the marker within the map if needed. In some instances, the computing system may speed up the matching process using an approximate nearest neighbor search in a kd-tree of the map of markers that can be rebuilt after adding new markers or rebuilding the map in general.

In some examples, a computing system may determine matches by going through all points in a set and matching each point with the closest point in another set of points. In particular, closest points within distance thresholds may be considered matches. In other examples, a computing system may use kd-trees or other search structures that may enable searching for matches faster.

In order to identify marker detections that are likely false detections, the computing system may monitor a local detection history to determine whether the marker is stable. Stable markers are included in the final map of marker positions as either new markers or to correct previously added markers. The computing system may distinguish an intermediate map representation that contains information about all markers detected within scans of the environment from a final map of the marker positions that only contains stable markers and no false detections likely caused by highly reflective surfaces.

In some examples, the computing system may monitor a local detection history for each mapped marker to remove false detections. For instance, in a local window of n scans, the computing system may add a negative (for every mapped marker) for every scan added and a positive if the scan contained a marker detection matching the mapped marker. An example of the local window of detection is shown below in table 1.

TABLE 1

| X | X | X | X | X | X | ○ | X | X | X | ○ | X | X | ○ | X | X | X | X | ○ | ○ |
|---|---|---|---|---|---|---|---|---|---|---|---|---|---|---|---|---|---|---|---|

Local detection history:
Square = a scan of the environment
"X" = detected marker,
"○" = no marker detected.
window size 20 with 15 detections = 75% detection rate As shown in table 1, the computing system may use a window size of n=20 scans of the environment. Once the local window of a mapped marker shows a threshold amount of positives (e.g., 75% positives of the total scans), the computing system may consider the marker stable. As such, the computing system may continue to update the stable marker, which cannot thereafter become unstable unless manually removed or if considered unstable during a complete rebuild of the final map of markers. In case the graph considerably changes from adding new scans (e.g., in the case of global optimization), the computing system may rebuild the map of markers, which may involve using a higher threshold for determining when a marker is stable (e.g., over 80% positives threshold of the total scans).

In some examples, the computing system may be configured to update the position of markers within the map of markers. For instance, to update the position of a mapped marker, the computing system may incrementally compute the mean μ over all n positions $p_i$ of matching marker detections as shown in equation [2]:

$$\mu_n = \frac{1}{n}\sum_{i=1}^{n} p_i = \mu_{n-1} + \frac{1}{n}(p_n - \mu_{n-1}) \quad [2]$$

As shown in equation [2], the computing system may weigh all marker detections equally, but may use incremental weighted mean in some examples to give markers detected closer to the sensor a higher weight than markers detected far away from the robot since the noise in the measured positions likely increase with distance. The computing system may also compute an incremental covariance for the aggregated position to provide an additional way of discriminating false from true marker detections since a false detection may likely show a larger variance. Further, the computing system may also switch from point-to-point errors to covariance-based error functions in pose monitoring and the cost functions of the graph optimizations.

Figure 5:
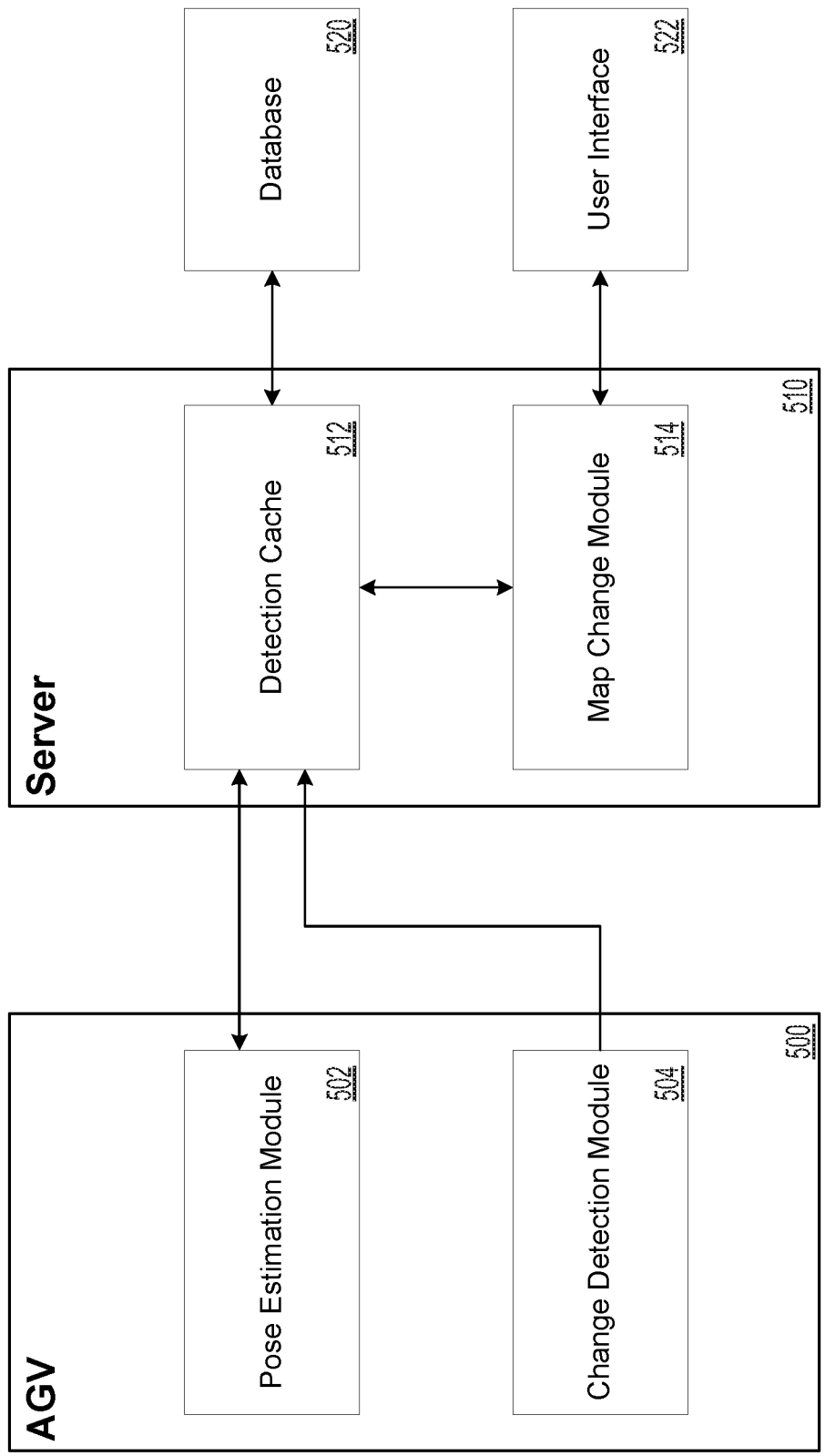
FIG. 5 is a functional block diagram illustrating modules of a robot and server, in accordance with an example embodiment.

FIG. 5 illustrates a functional block diagram of robot 500 communicating with a server 510 to help the server 510 maintain a map of a marker setup. Robotic device 500 includes a pose estimation module 502 and a change detection module 504. Server 510 includes a detection cache 512 and a map change module 514.

Pose estimation module 502 may receive sensor data, such as laser scan data and odometry data, to identify one or more detected markers in a local area of robot 500. Pose estimation module 502 may perform a SLAM process to determine a transformation that relates detected markers to known locations of markers in a map of the marker setup. For example, pose estimation module 502 may operate similarly to pose estimation module 402 described above with respect to FIG. 4. Pose estimation module 502 may provide an estimated pose of the robot 500 as well as sets of detections to change detection module 504.

Change detection module 504 may compare a map of the marker setup (e.g., expected locations of mapped markers relative to robot 500) to detected candidate markers in the environment, and may determine differences between the mapped markers and the detected candidate markers. Detected markers may be detected in some, but not all, of the scans within a scan window. In other words, each detected marker might be detected at a detection rate measured over a number of scans such as 25 scans or over a time period such as 10 minutes. Change detection module 504 may compare the detection rate to a threshold rate (e.g., 70% in a window of 25 scans) to identify detections to report to server 510.

More specifically, the comparison performed by change detection module 504 may include detecting changes in reflector positions as well as outliers in the comparisons. In particular, the outliers may be either reflectors in the local map not contained in the original map or reflectors in the original map not contained in the local map. Change detection module 504 may provide detection statistics and changes to detection cache 512 of server 510.

Detection cache 512 of server 510 may store or have access to an updated version of a map of the marker setup.

The map may also include representations of last detection times of each mapped marker. Detection cache 512 can send a representation of the map of the marker setup to robot 500 for use in localizing robot 500. In turn, detection cache 512 may receive an indication of a pose estimate of robot 500 from pose estimation module 502, and indications of detection statistics of a locally built map of detected markers from change detection module 504. Some of the detection statistics may relate to detections of one or more markers or reflective surfaces that are not mapped. Detection cache 512 may update the map to indicate last detection times of the set of mapped markers. Detection cache 512 may also identify additional markers that are candidates to add to the map based on the received poses and detection statistics.

Database 520 may store past versions of the map, pose estimates, and detection statistics, and may communicate with detection cache 512 when information is received from each of a plurality of robotic devices in the environment.

Detection cache 512 may communicate with map change module 514 to identify potential changes to the map of markers. For example, detection cache 512 may send collected detection statistics for the set of mapped markers to map change module 514, and map change module 514 may identify markers to flag as not recently detected. Map change module 514 may also identify one or more detected markers as candidates to either be added as new markers in the map or designated as a portion of the marker setup that should be ignored. A portion of the marker setup that should be ignored may be referred to as a negative region.

Determining that a given mapped marker should be flagged as not recently detected may include determining that a last detection time of the mapped marker meets or exceeds a threshold amount of time. The threshold may be predetermined, or can be based on last detection times of neighboring mapped markers.

In additional examples, an action may be initiated for an undetected mapped marker after verifying that there has been sufficient robotic device activity in the vicinity of the mapped marker so as to justify the action. For instance, after identifying the marker having the last detection time older than the threshold amount of time, server 510 may verify a level of robotic device activity in an area proximate to the identified marker since the last detection time of the identified marker. In some instances, a level of robot activity in a region of the environment associated with the mapped marker is relatively low, implying less likelihood that the mapped marker will be detected within the threshold amount of time. In further examples, server 510 may adjust the threshold amount of time based on the determined level of robot activity.

Determining that a detected marker is a candidate for addition to the map may include determining that the detected marker does not correspond to an already mapped marker. In some cases, a threshold number of reports of the detected marker by one or more robots may be required before the detected marker is identified as a candidate for addition.

Map change module 514 may communicate with a user interface 522 to effectuate changes to the map. User interface 522 may be graphical user interface (GUI) presented on a screen, such as a touch screen. Map change module 514 may determine a subset of detected markers that are candidates for addition to the map. Server 510 may provide, by way of user interface 522, an option to add one or more of the subset of detected markers to the map. Based on an interaction received by way of the user interface, map change module 514 might confirm one or more of the candidate markers, mark them as negative regions, or remove them from the map.

Map change module 514 may additionally or alternatively initiate physical changes to the marker setup to rectify identified issues with the setup. For example, a mapped marker that is not consistently detected may be occluded from a field of view of robotic device sensors, or might otherwise be obstructed from being detected. Accordingly, map change module 514 may provide, by way of user interface 522, an instruction for a user to remove such an obstruction, to move the mapped marker, or simply to take the mapped marker down. Map change module 514 may also instruct a robotic device to automatically remove the obstruction, move the mapped marker, or remove the mapped marker from the marker setup.

Communications between robot 500 and server 510 that cause updates to the map may be performed as part of a regular operating procedure. For instance, one or more robotic devices may periodically detect sets of markers and send indications of the sets of detected markers at regular time intervals. A regular time interval for such scanning of the environment might be once every minute, five minutes, or hour, though other intervals are possible. Server 510 may update the map based on the periodically received sets of detected markers.

Though FIG. 5 depicts particular modules of robot 500 and server 510 communicating to determine candidate changes to a map of the marker setup, other architectures are possible. It should be understood that additional or fewer components of a system may carry out the same functions to make changes to a map of the marker setup.

Figure 6:
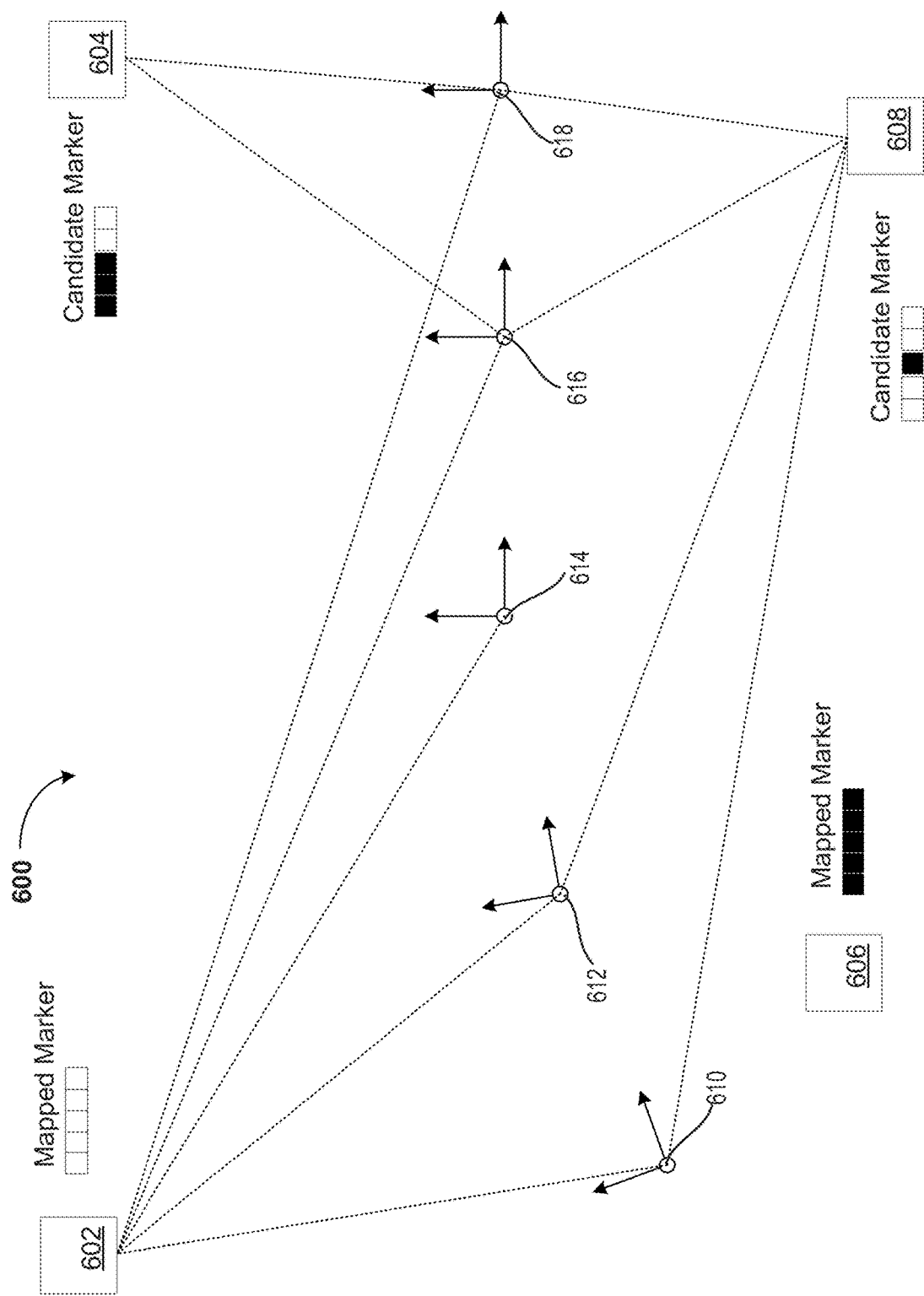
FIG. 6 illustrates poses of a robotic device in a scan window, in accordance with an example embodiment.

FIG. 6 depicts poses of a robotic device operating in a scan window 600. Scan window 600 may correspond to a portion of an environment of the robotic device that contains a subset of markers in the marker setup. Within the scan window, the robotic device may determine a local map and localize itself within the environment using the subset of markers. In particular, the robotic device may scan the surrounding environment in scan window 600 to detect markers.

The robotic device may operate in successive scan windows at regular intervals such that each successive portion of the environment is locally mapped. For instance, each scan window may correspond to a predetermined amount of time or a predetermined number of scans. Further, the data obtained in each scan window may be segregated in order to ensure that changes that occur between successive scans do not affect related detections of the robotic device. Because each scan window will take a fraction of the time required to scan the entire environment, the robotic device may provide up to date and accurate information about markers within the environment.

Prior to, or concurrently with, localizing the robotic device within scan window 600, the robotic device may receive a representation of the map of the marker setup from a server, such as server 510. The representation may include known locations of mapped markers. Combined with a predetermined estimate of the pose of the robotic vehicle and scanning data obtained within the scan window, the robotic vehicle can use the received map information to determine a local map of the environment that includes nearby markers and candidate markers.

Scan window 600 includes mapped markers 602 and 606, and candidate markers 604 and 608, and depicts a robotic vehicle at poses 610, 612, 614, 616, and 618. Further, FIG. 6 depicts detections for each marker and candidate marker at those poses. At pose 610, the robotic vehicle detects mapped marker 602 and candidate marker 608. At pose 612, the robotic vehicle detects mapped marker 602 and candidate marker 608. At pose 614, the robotic vehicle detects mapped marker 602. At pose 616, the robotic vehicle detects mapped marker 602, candidate marker 604, and candidate marker 608. At pose 618, the robotic vehicle detects mapped marker 602, candidate marker 604, and candidate marker 608. The depicted scans may be representative of additional scans of the environment. For example, each scan window may include between 25 and 50 scans performed by the robotic devices.

Also depicted in FIG. 6 are representations of the detection rate for each marker and candidate marker. Mapped marker 602 is detected at 100% of the depicted poses, while mapped marker 606 is detected 0% of the time. This may indicate that mapped marker 606 has been taken down or is obstructed from a field of view of scanning sensors associated with the robotic device. Further, candidate marker 604 is detected at a 40% rate, and candidate marker 608 is detected at an 80% rate. In some examples, a threshold detection rate can be associated with how useful a marker or candidate marker is for localizing robotic devices. Accordingly, data that corresponds to markers and candidate markers detected at or above the threshold rate may be published, while other data is ignored. In the present example, it is presumed that the threshold rate is 70%, so mapped marker 602 and candidate marker 608 are published to the server, while data related to mapped marker 606 and candidate marker 608 is not published. In addition, the robotic vehicle may determine that detections of mapped marker 606 fall below the threshold and send this determination to the server.

After completing the scan window, the robotic device publishes the data corresponding to the mapped marker 602 and candidate marker 608, and resets its local map for its next successive scan window in the environment. The server uses the published data to determine whether certain markers are candidates for removal from the map of the marker setup, such as mapped marker 606, and whether candidate markers, such as candidate marker 608, might be suitable for addition to the map as mapped markers. The server may also timestamp the published markers and candidate markers. If an update to the map of the marker setup occurred during the scan window, the server may additionally send the updated version of the map to the robotic vehicle for use in localizing the robotic vehicle in successive scan windows.

Figure 7A:
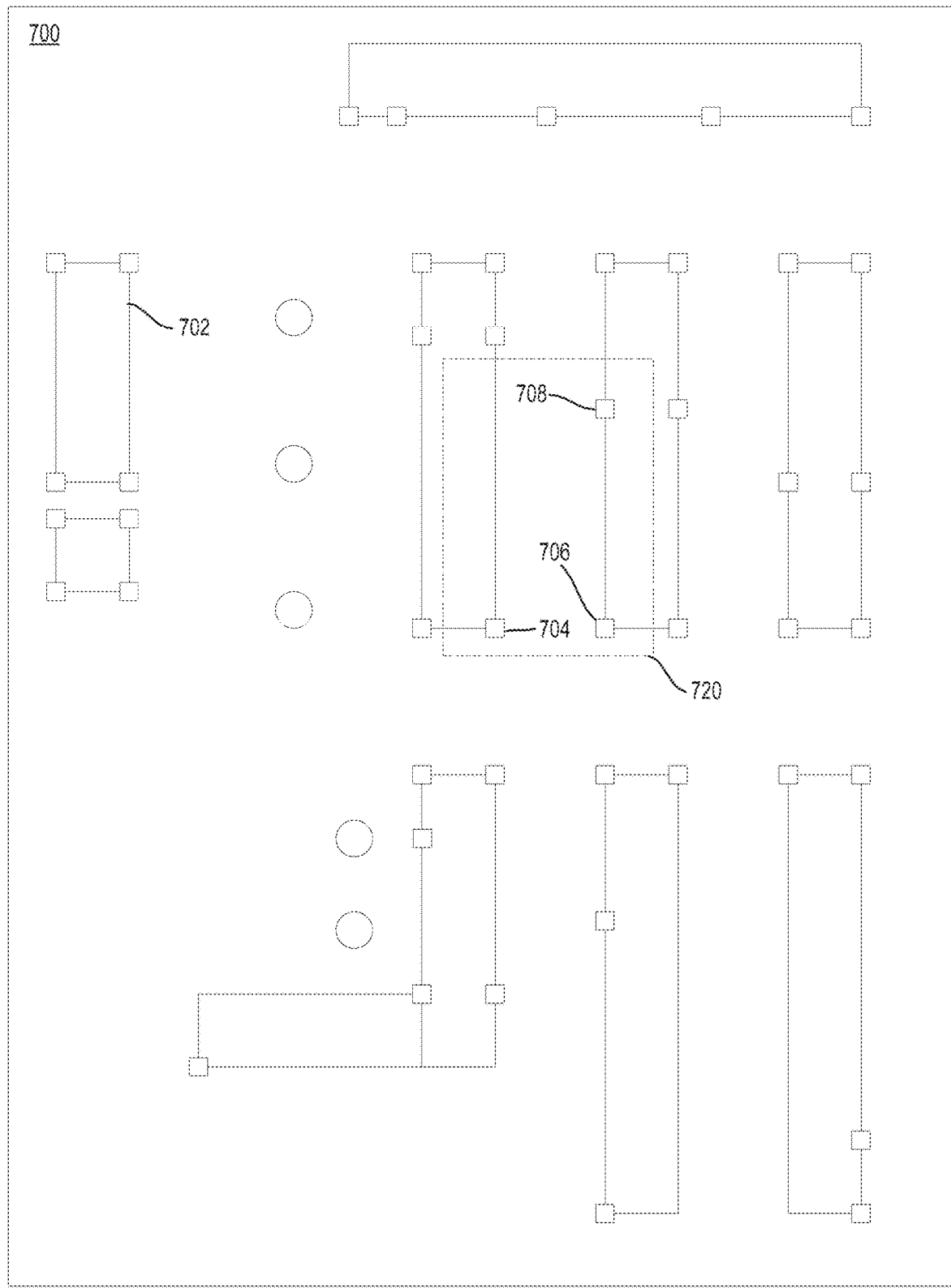
FIG. 7A illustrates an initial map of a marker setup for localizing a robot, in accordance with an example embodiment.

FIG. 7A depicts an initial map 700 of a marker setup used for localizing a robotic device. The map includes indications of objects, such as object 702, and markers, such as markers 704, 706, and 708. Initial map 700 may represent a recently constructed marker setup in an environment. FIG. 7A also indicates a scan window 720, which corresponds to a locally built marker map of the environment of a robotic device used for updating initial map 700. Scan window 720 can be one scan window of a sequence of scan windows that collectively validate and/or update initial map 700.

Figure 7B:
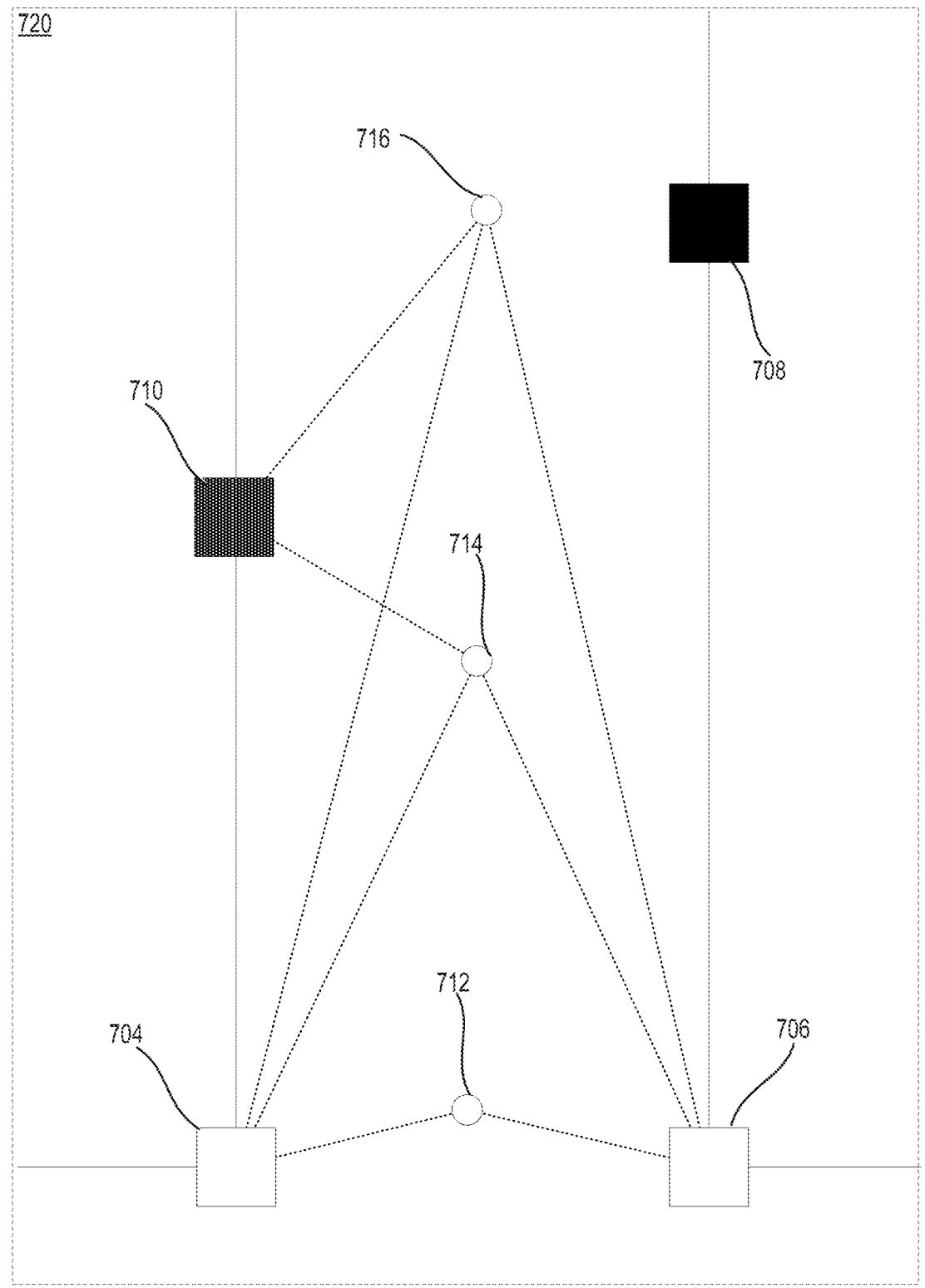
FIG. 7B illustrates a local map of a portion of a marker setup for localizing a robot, in accordance with an example embodiment.

FIG. 7B depicts an expanded view of scan window 720. The corresponding locally built marker map generated by a robotic device includes a set of four markers. Markers 704, 706, and 708 are depicted in initial map 700, and candidate marker 710 is not. FIG. 7B also shows three scanning positions of the robotic device: first position 712, second position 714, and third position 716. Though not depicted, several more scanning positions may be included in scan window 720.

FIG. 7B additionally shows detections associated with each detected marker. Markers 704 and 706, but not marker 708 or candidate marker 710, are detected at first position 712. Markers 704 and 706 and candidate marker 710, but not marker 708, are detected at second position 714 and third position 716. The robotic device may localize itself at each scanning position, and associate detected candidate markers with mapped markers by determining the detected candidate markers that are located within a threshold distance of a known location of a mapped marker. Accordingly, at each scanning position, or at least at the end of each scan window, the robotic device may associate the detected markers with mapped markers and track detection statistics for the detected marker.

Markers 704 and 706 have been marked to indicate that they were detected more frequently that a threshold detection rate within the scan window, marker 708 has been marked to indicate that it was detected less frequently than the threshold detection rate within the scan window, and marker 710 has been marked to indicate that it does not correspond to a mapped marker.

The robotic device may send pose information, positions of the detected set of markers, and detection statistics for each marker to a server, such as server 510 described above with respect to FIG. 5. Responsive to receiving this information from the robotic device, the server may perform an action related to potentially updating the map. For instance, a user interface may be provided that includes an option to add a candidate marker, such as detected marker 710. The user interface may also flag a marker which has not been detected in more than a threshold amount of time, such as marker 708.

Figure 7C:
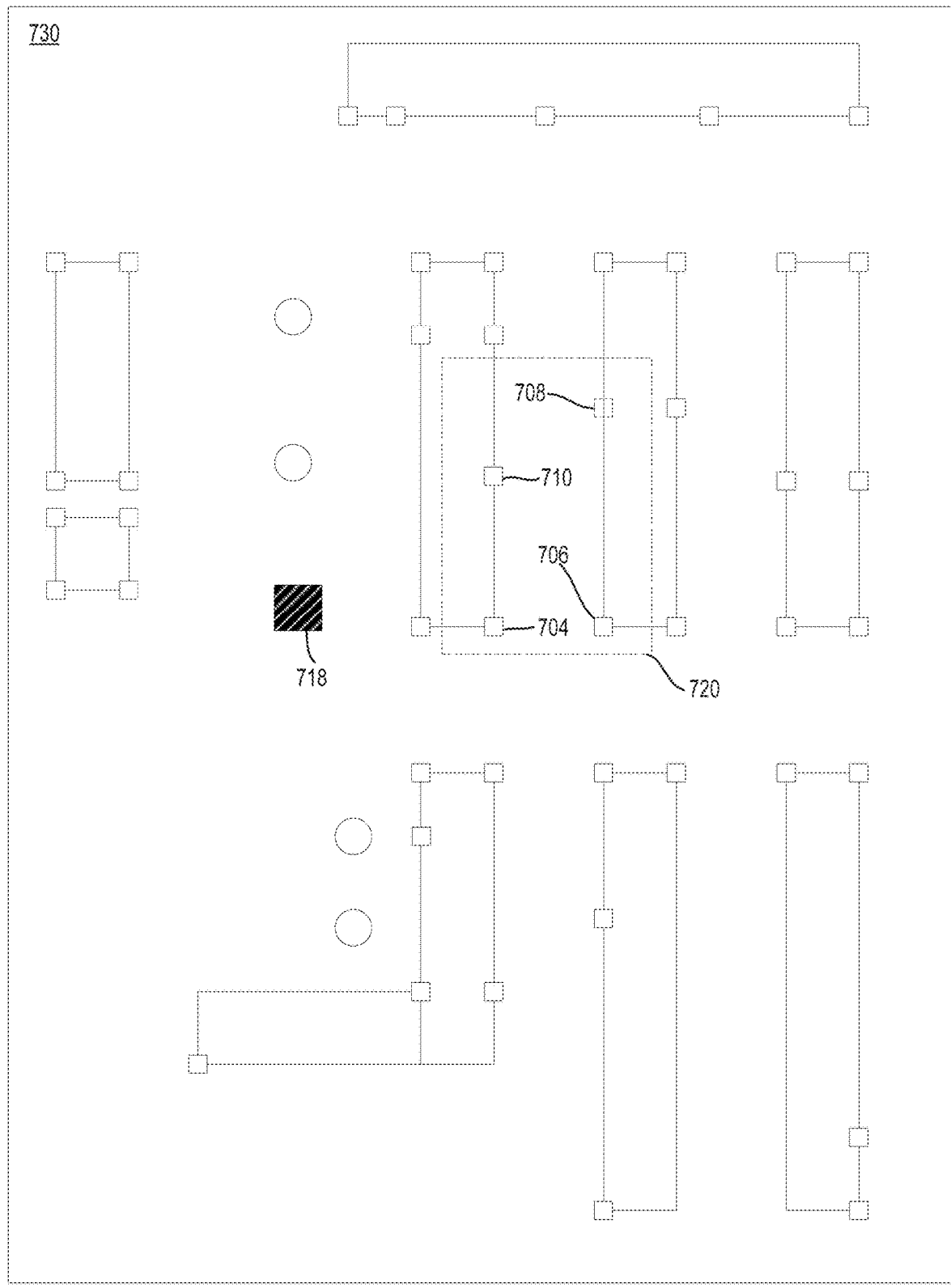
FIG. 7C illustrates an updated map of a marker setup for localizing a robot, in accordance with an example embodiment.

FIG. 7C depicts an updated map 730 of the marker setup. Updated map 730 shows that markers 704 and 706 remain unchanged, marker 708 is flagged as a marker that has not been recently detected in the marker setup, and candidate marker 710 has been added to the marker setup (e.g., after user confirmation). Updated map 730 shows an additional change. In particular, negative region 718 has been added to the map. Negative region 718 may correspond to one or more candidate markers that were detected as part of a different scan window of the robotic device or another robotic device. A user may indicate that the one or more candidate markers were negative markers via the user interface. Negative region 718 may prevent future candidate markers from being flagged in the region via the user interface. Negative region 718 may also be transmitted back to one or more robots to use in localization.

Figure 8:
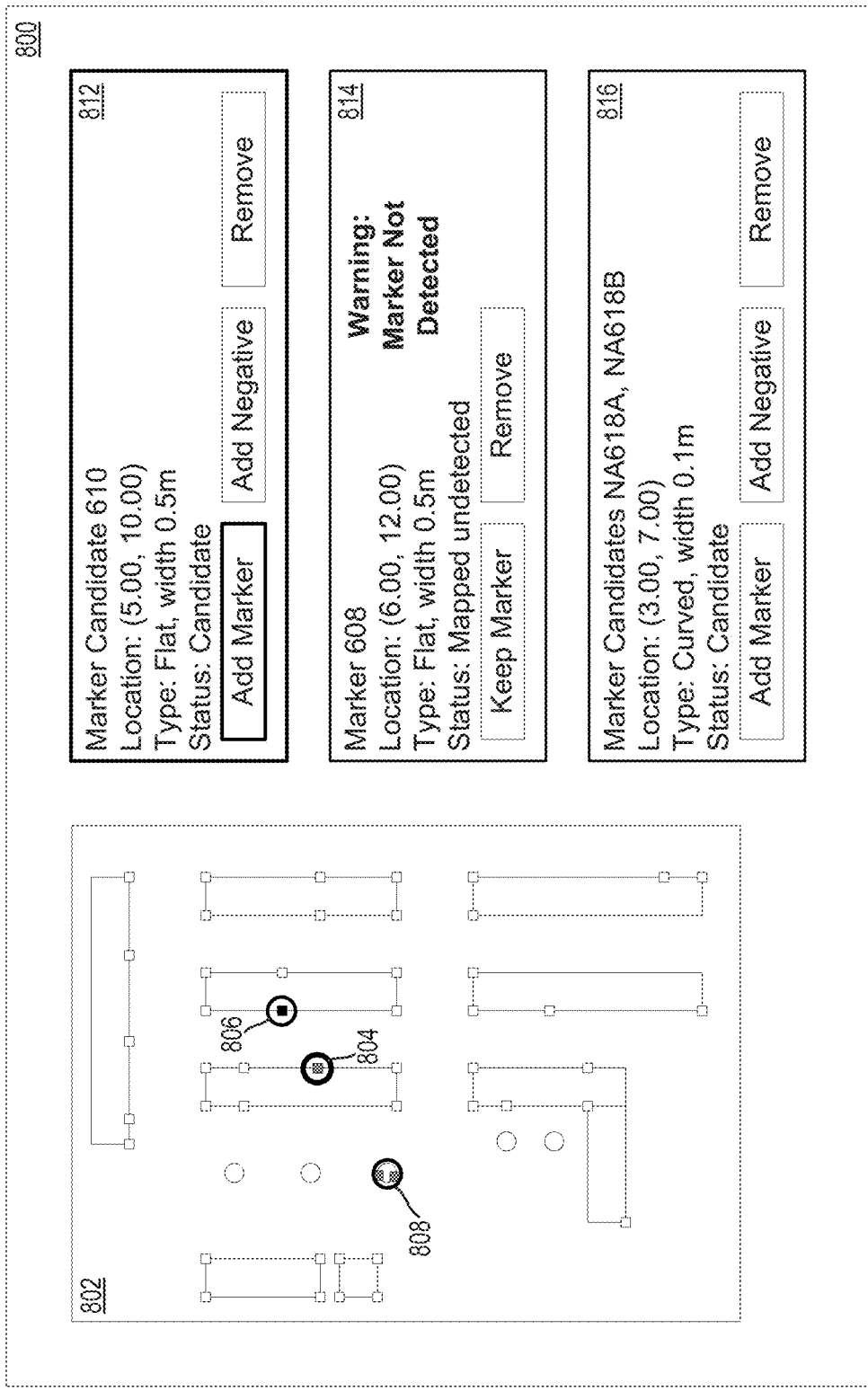
FIG. 8 illustrates a user interface for updating a map of a marker setup for localizating a robot, in accordance with an example embodiment.

FIG. 8 depicts a user interface 800 used to receive user input related to the marker setup. A server device, based on received detection statistics, last detection times, and other existing map data, may determine candidate changes to the map. In the present example, three candidate changes have been identified based on information related to successive scan windows.

The candidate changes may be presented by way of a graphical representation 802 of the map that highlights points of interest. For example, graphical representation 802 includes indicator 804, which corresponds to candidate marker 710 depicted in FIG. 7B, indicator 806, which corresponds to undetected mapped marker 708 depicted in FIG. 7B, and indicator 808, which corresponds to a cluster of candidate markers that correspond to negative region 718 depicted in FIG. 7C.

User interface 800 additionally includes selectable options related to the candidate changes. For instance, menu 812, which corresponds to indicator 804 and candidate marker 710, includes an option to add the marker to the map, add a negative region surrounding the location of candidate marker 710 to the map, or to remove the candidate marker from the map. These options may be provided in response to determining that candidate marker 710 was detected at or above a threshold detection rate during one or more scan windows. Selection of the option to add the marker may cause robotic devices to use candidate marker 710 when localizing themselves within the environment. Conversely, selection of the option to add a negative region to the map may prevent future flagging of candidate markers in the region and/or cause robotic devices to ignore detections emanating from the negative region, or to stop scanning in the direction of the negative region. Selection of the option to remove the candidate marker from the map may remove the candidate marker, but allow another candidate marker in the same area to be flagged in the future. The example depicted in FIG. 7C where candidate marker 710 is mapped is a result of selecting the "add marker" option.

User interface 800 further includes menu 814, which corresponds to indicator 806 and mapped marker 708. Menu 814 may include a warning provided in response to determining that a mapped marker, such as mapped marker 708, has not been detected for more than a threshold amount of time. In some examples, the user interface 800 may flag the marker as being undetected so that a user can investigate. The user may then selection an option to keep or remove the marker from the map. In other examples, a robot may be deployed to investigate the area and possibly replace the marker, either automatically or in response to user input.

User interface 800 additionally includes menu 816, which corresponds to a cluster of candidate markers. Though multiple candidate markers may exist in close proximity, the options to add them, add a negative region, or to remove them, may be presented similarly to menu 812. The example depicted in FIG. 7C where negative region 718 is mapped is a result of selecting the "add negative" option.

Figure 9:
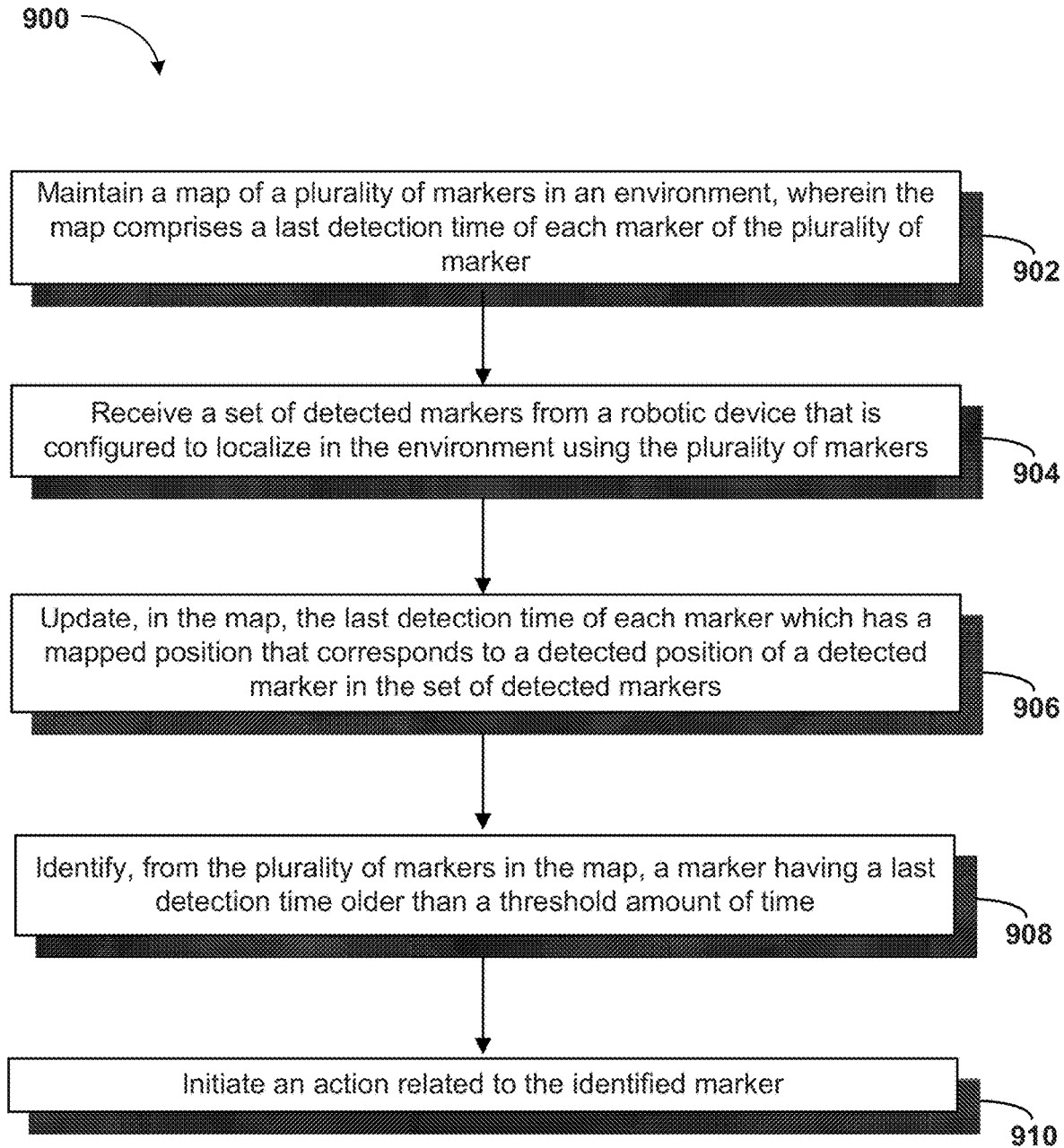
FIG. 9 is a flowchart of a method, in accordance with an example embodiment.

FIG. 9 is a flowchart of a method 900, in accordance with an example embodiment. Method 900 can be a computer-implemented method. For example, method 900 can be executed by a computing device, such as server 510. In other examples, method 900 may be executed by a robotic device, such as robot 500. Method 900 can be implemented in combination with aspects of method 1000 described below with respect to FIG. 10 and/or aspects of method 1100 described below with respect to FIG. 11.

Block 902 of method 900 can be performed to maintain a map of a plurality of markers in an environment. The map can include a last detection time (e.g., a clock time) of each marker of the plurality of markers. For example, the map may be the same or similar to initial map 700 depicted in FIG. 7A.

Block 904 of method 900 can be performed to receive a set of detected markers from a robotic device that is configured to localize in the environment using the plurality of markers. In some examples, receiving the set of detected markers from the robotic device can include receiving a locally built marker map of a portion of the environment from the robotic device. The robotic device may be the same or similar to that described above with respect to FIG. 1 or FIG. 5. The locally built marker map may be the same or similar to the locally built map depicted in FIG. 7B, and may correspond to a scan window, such as that depicted in FIG. 6.

Block 906 can be performed to update, in the map, the last detection time of each marker which has a mapped position that corresponds to a detected position of a detected marker in the set of detected markers. In some examples, this step can include updating the last detection time of each marker which has a mapped position within a threshold distance of a detected position of a detected marker.

Block 908 can be performed to identify, from the plurality of markers in the map, a marker having a last detection time older than a threshold amount of time. Thus, a marker may be identified which has not been reported as detected by any robot within the threshold amount of time.

Block 910 can be performed to initiate an action related to the identified marker. In some examples, initiating the action can be performed in response to identifying the marker having the last detection time older than the threshold amount of time. In some examples, initiating the action can include causing a graphical user interface, such as user interface 800, to display a graphical representation of the map and an indication of the identified marker. Initiating the action can additionally or alternatively include providing instructions to the robotic device or to a different robotic device to travel to an area proximate to the identified marker to locate or replace the identified marker.

Method 900 can further include, after identifying the marker having the last detection time older than the threshold amount of time, verifying a level of robot activity in an area proximate to the identified marker since the last detection time of the identified marker. In these examples, initiating the action can be performed in response to the verifying.

In some examples, the plurality of markers are retroreflective markers, and the robotic device is configured to detect the retroreflective markers using a laser-based sensor.

In some examples, method 900 further includes periodically receiving sets of detected markers from the robotic device at a regular time interval, and updating the map based on the periodically received sets of detected markers.

In further examples, method 900 can include causing the robotic device to run a localization process during each scan window of a sequence of scan windows. In these examples, each run of the localization process can generate a respective set of markers detected by the robotic device more frequently than a threshold detection rate during a corresponding scan window of the sequence of scan windows.

In additional examples, method 900 can include adjusting the threshold amount of time for different regions of the environment based on a level of robot activity in each region of the different regions.

In still further examples, method 900 can include identifying, in the set of detected markers, a candidate marker which has a detected position which does not correspond to a mapped position of any marker in the map, and initiating a different action related to the candidate marker. In these examples, initiating the different action can be performed in response to a threshold number of reports of the candidate marker by the robotic device or a different robotic device. Further, initiating the different action can include causing a graphical user interface to display a graphical representation of the map and an indication of the candidate marker.

In examples where candidate markers are detected, and a different action is initiated using a graphical user interface, method 900 can also include receiving, via the graphical user interface, an input signal confirming the candidate marker, adding the confirmed candidate marker to the map, and providing instructions to the robotic device to use the confirmed candidate marker for localization. In such examples, method 900 can alternatively include receiving, via the graphical user interface, an input signal identifying the candidate marker as a negative region, and adding the negative region to the map. The negative region can prevent future designation of candidate markers in the negative region. In these examples, method 900 can further include providing instructions to the robotic device to ignore detections in the negative region during localization. In these examples, method 900 can also alternatively include receiving, from the graphical user interface, an input signal indicating to remove the candidate marker from the map, and removing the candidate marker from the map. The removing can allow a future designation of the candidate marker based on additional future detections.

Figure 10:
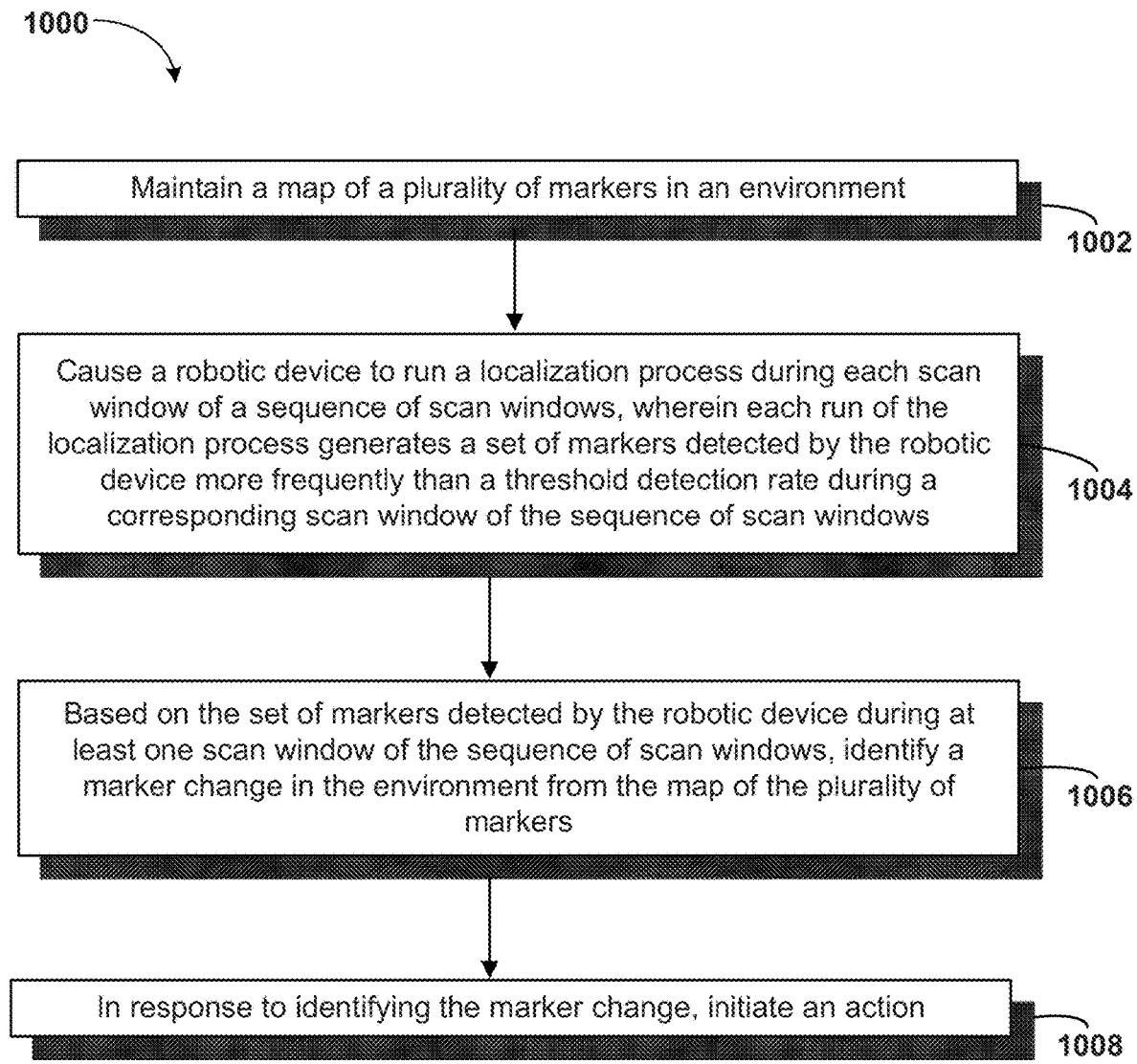
FIG. 10 is a flowchart of another method, in accordance with an example embodiment.

FIG. 10 is a flowchart of a method 1000, in accordance with an example embodiment. Method 1000 can be a computer-implemented method. For example, method 1000 can be executed by a computing device, such as server 510. In alternative examples, method 1000 may be executed by a robotic device, such as robot 500. Method 1000 can be implemented in combination with aspects of method 900 described above with respect to FIG. 9. For example, operations described with respect to method 900 can be performed in connection with those now described with respect to method 1000, or those described with respect to method 1100 below.

Block 1002 of method 1000 can be performed to maintain a map of a plurality of markers in an environment.

Block 1004 of method 1000 can be performed to cause a robotic device to run a localization process during each scan window of a sequence of scan windows. Each run of the localization process can generate a set of markers detected by the robotic device more frequently than a threshold detection rate during a corresponding scan window of the sequence of scan windows.

Block 1006 of method 1000 can be performed to, based on the set of markers detected by the robotic device during at least one scan window of the sequence of scan windows, identify a marker change in the environment from the map of the plurality of markers. For example, the set of detected markers can be compared to an expected set of markers represented in the map that corresponds to the at least one scan window. Identifying the change in the environment can include determining that the set of detected markers includes more markers than the expected set, denoting that a candidate marker has been added to the environment. Identifying the change can include determining that the set of detected markers includes fewer markers than the expected set, denoting that a marker may have been removed from the environment or occluded from a field of view of a scanning sensor associated with the robotic device. Identifying the change can also include determining that a marker in the set of detected markers is in a different location than an expected location of a corresponding marker from the expected set, denoting that the marker moved to a different position in the environment, or that the marker has been removed and that a different candidate marker has been added to the environment.

Block 1008 of method 1000 can be performed to initiate an action in response to identifying the marker change.

Figure 11:
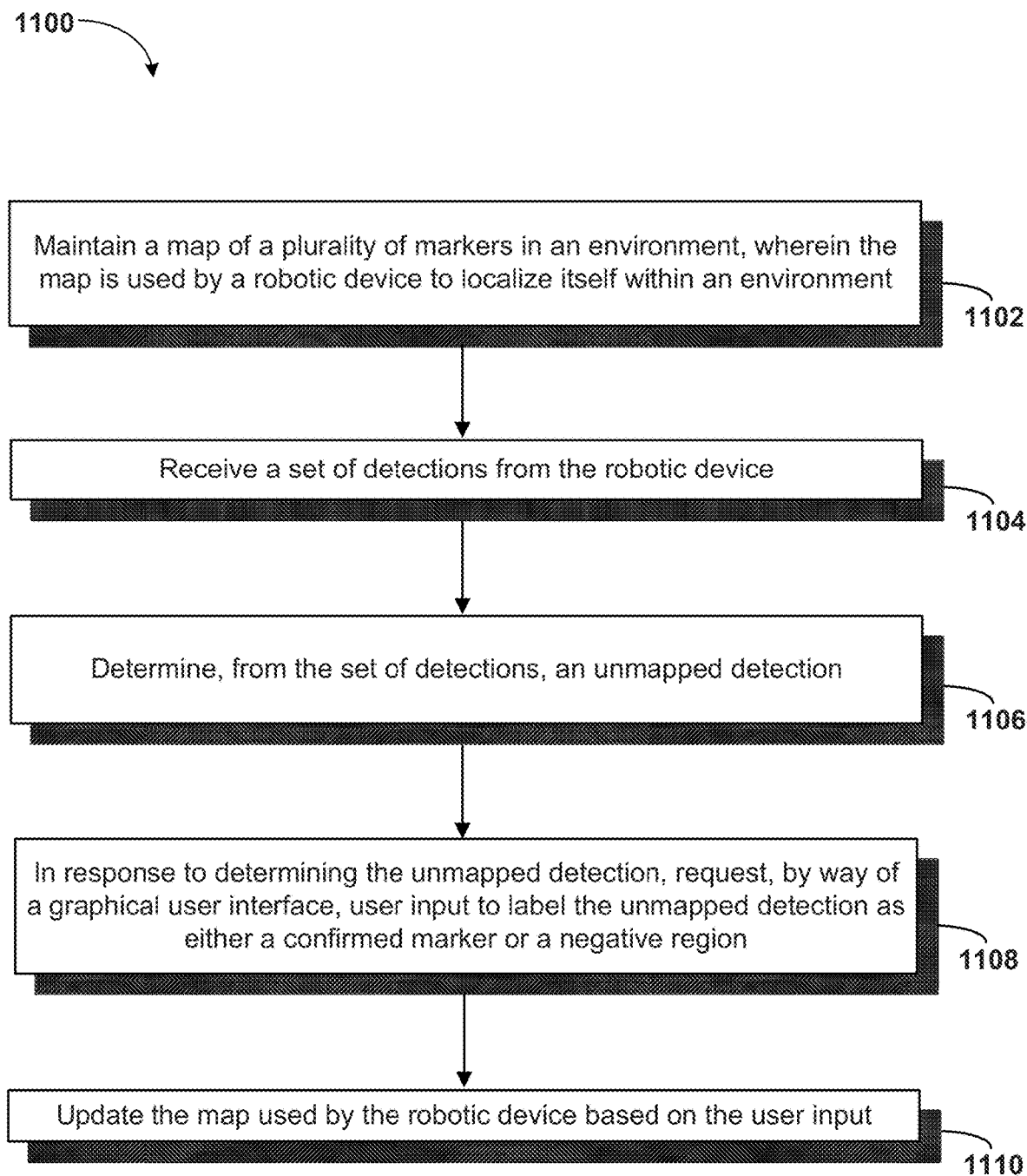
FIG. 11 is a flowchart of another method, in accordance with an example embodiment.

FIG. 11 is a flowchart of a method 1100, in accordance with an example embodiment. Method 1100 can be a computer-implemented method. For example, method 1100 can be executed by a computing device, such as server 510. In alternative examples, method 1100 may be executed by a robotic device, such as robot 500. Method 1100 can be implemented in combination with aspects of method 900 described above with respect to FIG. 9 and/or aspects of method 1000 described above with respect to FIG. 10.

Block 1102 of method 1100 can be performed to maintain a map of a plurality of markers in an environment. The map can be used by a robotic device to localize itself within an environment. The map can be the same or similar to initial map 700 described above with respect to FIG. 7A.

Block 1104 of method 1100 can be performed to receive a set of detections from the robotic device. The set of detections can correspond to sensor hits detected in a scan window, such as that depicted in FIG. 6.

Block 1106 of method 1100 can be performed to determine, from the set of detections by the robotic device, an unmapped detection. An unmapped detection is a sensor signal representative of a position which does not correspond to any mapped marker. For instance, when located in the map, an unmapped detection is not within a threshold distance of any mapped marker. Unmapped detections can represent, for example, markers, reflective surfaces, or other detections that are not represented by the map of markers in the environment. Such an unmapped detection can correspond to a candidate marker that has not yet been mapped. For example, candidate marker 710 depicted in FIG. 7B can be referred to as an unmapped detection.

Block 1108 of method 1100 can be performed to, in response to determining the unmapped detection, request, by way of a graphical user interface, user input to label the unmapped detection as either a confirmed marker or a negative region. For example, a graphical user interface, such as user interface 800 depicted in FIG. 8, can be provided to the user. The graphical user interface can include an option to add the unmapped marker to the map or to add a negative region at a location of the unmapped marker. The option may correspond to the request for user input. Receiving user input by way of the graphical user interface may involve, for example, receiving a selection of "add marker" or "add negative" in menu 812 as depicted in FIG. 8).

Block 1110 of method 1100 can be performed to update the map used by the robotic device based on the user input. In particular, when the user input labels the unmapped detection as a confirmed marker, a message may be sent back to the robot to cause the robot to incorporate the confirmed marker into a map of markers used by the robot for localization. Alternatively, when the user input labels the unmapped detection as a negative region, a message may be sent back to the robot to cause the robot to incorporate the negative region into the map of markers and disregard future detections in this region. In this manner, a marker map may be efficiently generated and updated by the robot with the assistance of an operator in the loop.

In some examples, a computing device can be provided, where the computing device includes one or more processors, and one or more computer readable media. The one or more computer readable media can have computer-readable instructions stored thereon that, when executed by the one or more processors, cause the computing device to carry out functions that include methods 900, 1000, or 1100.

In other examples, a computing device can be provided, where the computing device includes means for carrying out methods 900, 1000, or 1100.

In even other examples, an article of manufacture can be provided. The article of manufacture can include one or more computer readable media having computer-readable instructions stored thereon that, when executed by one or more processors of a computing device, cause the computing device to carry out functions that include methods 900, 1000, or 1100. In some of these examples, the one or more computer readable media can include one or more non-transitory computer readable media.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
maintaining, by a computing device, a map of a plurality of markers in an environment, wherein the map comprises a last detection time of each marker of the plurality of markers;
receiving, by the computing device, a set of detected markers from a robotic device that is configured to localize in the environment using the plurality of markers;
updating, by the computing device, in the map, the last detection time of each marker which has a mapped position that corresponds to a detected position of a detected marker in the set of detected markers;
identifying, by the computing device from the plurality of markers in the map, a marker having a last detection time older than a threshold amount of time;
responsive to identifying the marker having the last detection time older than the threshold amount of time:
determining, by the computing device, a level of robot activity of a plurality of robotic devices since the last detection time of the identified marker, wherein the level of robot activity is determined for an area within the environment such that the area within the environment is proximate to a mapped location of the identified marker;
verifying, by the computing device, that the determined level of robot activity indicates that at least a certain number of the plurality of robotic devices have traversed the area within the environment since the last detection time of the marker and thereby is sufficient to justify removal of the identified marker from the map; and
based on verifying that the determined level of robot activity indicates that at least the certain number of the plurality of robotic devices have traversed the area within the environment since the last detection time of the marker and thereby is sufficient to justify removal of the identified marker from the map, removing, by the computing device, the marker having the last detection time older than the threshold amount of time from the map; and
after removing the marker from the map, causing, by the computing device, one or more robotic devices to navigate within the environment based on the map.

2. The method of claim 1, further comprising:
causing a graphical user interface to display a graphical representation of the map and an indication of the identified marker.

3. The method of claim 1, further comprising:
responsive to the identifying, providing instructions to the robotic device or to a different robotic device to travel to the area within the environment to locate or replace the identified marker.

4. The method of claim 1, wherein the plurality of markers are retroreflective markers, and wherein the robotic device is configured to detect the retroreflective markers using a laser-based sensor.

5. The method of claim 1, wherein receiving the set of detected markers from the robotic device comprises receiving a locally built marker map of a portion of the environment from the robotic device.

6. The method of claim 1, wherein updating the last detection time of each marker which has a mapped position that corresponds to a detected position of a detected marker in the set of detected markers comprises updating the last detection time of each marker which has a mapped position within a threshold distance of a detected position of a detected marker.

7. The method of claim 1, further comprising:
periodically receiving sets of detected markers from the robotic device at a regular time interval; and
updating the map based on the periodically received sets of detected markers.

8. The method of claim 1, further comprising:
causing the robotic device to run a localization process during each scan window of a sequence of scan windows, wherein each run of the localization process generates a respective set of markers detected by the robotic device more frequently than a threshold detection rate during a corresponding scan window of the sequence of scan windows.

9. The method of claim 1, further comprising:
adjusting the threshold amount of time such that a different threshold amount of time is used for each region of a plurality of different regions of the environment based on a regional level of robot activity in each region of the plurality of different regions, wherein the area within the environment is one of the plurality of different regions.

10. The method of claim 9, wherein adjusting the threshold amount of time based on the regional level of robot activity in each region of the different regions comprises:
determining that the regional level of robot activity in a particular region is lower than the regional level of robot activity in one or more other regions; and
increasing the threshold amount of time for the particular region.

11. The method of claim 1, further comprising:
identifying, in the set of detected markers, a candidate marker which has a detected position which does not correspond to a mapped position of any marker in the map.

12. The method of claim 11, further comprising:
receiving a threshold number of reports of the candidate marker by the robotic device or a different robotic device; and
responsive to receiving a threshold number of reports of the candidate marker, causing a graphical user interface to display a graphical representation of the map and an indication of the candidate marker.

13. The method of claim 12, further comprising:
receiving, via the graphical user interface, an input signal confirming the candidate marker;
adding the confirmed candidate marker to the map; and
providing instructions to the robotic device to use the confirmed candidate marker for localization.

14. The method of claim 12, further comprising:
receiving, via the graphical user interface, an input signal identifying the candidate marker as a negative region; and
adding the negative region to the map, wherein the negative region prevents future designation of candidate markers in the negative region.

15. The method of claim 14, further comprising providing instructions to the robotic device to ignore detections in the negative region during localization.

16. The method of claim 12, further comprising:
receiving, from the graphical user interface, an input signal indicating to remove the candidate marker from the map; and
removing the candidate marker from the map, wherein the removing allows a future designation of the candidate marker based on additional future detections.

17. The method of claim 1, further comprising:
responsive to identifying the marker having a last detection time older than a threshold amount of time, adding a negative region to the map corresponding to the marker, wherein the negative region prevents future designation of candidate markers in the negative region.

18. The method of claim 1, wherein the identified marker is a first marker, wherein the area within the environment is a first area within the environment, and wherein the method further comprises:
responsive to identifying a second marker having a last detection time older than the threshold amount of time:
determining a second level of robot activity of the plurality of robotic devices since the last detection time of the second marker, wherein the second level of robot activity is determined for a second area within the environment such that the second area within the environment is proximate to a mapped location of the second marker, wherein the second area is different from the first area;
verifying that the determined second level of robot activity indicates that less than the certain number of the plurality of robotic devices have traversed the second area within the environment since the last detection time of the second marker and thereby is not sufficient to justify removal of the second marker from the map; and
based on verifying that the determined second level of robot activity indicates that less than the certain number of the plurality of robotic devices have traversed the second area within the environment since the last detection time of the second marker and thereby is not sufficient to justify removal of the second marker from the map, retaining the second marker in the map for subsequent robotic navigation.

19. A computing device comprising at least one processor, wherein the computing device is configured to:
maintain a map of a plurality of markers in an environment, wherein the map comprises a last detection time of each marker of the plurality of markers;
receive a set of detected markers from a robotic device that is configured to localize in the environment using the plurality of markers;
update, in the map, the last detection time of each marker which has a mapped position that corresponds to a detected position of a detected marker in the set of detected markers;
identify, from the plurality of markers in the map, a marker having a last detection time older than a threshold amount of time;
responsive to identifying the marker having the last detection time older than the threshold amount of time:
determine a level of robot activity of a plurality of robotic devices since the last detection time of the identified marker, wherein the level of robot activity is determined for an area within the environment such that the area within the environment is proximate to a mapped location of the identified marker;

verify that the determined level of robot activity indicates that at least a certain number of the plurality of robotic devices have traversed the area within the environment since the last detection time of the marker and thereby is sufficient to justify removal of the identified marker from the map; and based on verifying that the determined level of robot activity indicates that at least the certain number of the plurality of robotic devices have traversed the area within the environment since the last detection time of the marker and thereby is sufficient to justify removal of the identified marker from the map, remove the marker having the last detection time older than the threshold amount of time from the map; and after removing the marker from the map, cause one or more robotic devices to navigate within the environment based on the map.

20. A non-transitory computer readable medium having stored therein program instructions executable by a computing system to cause the computing system to perform operations, the operations comprising:

maintaining a map of a plurality of markers in an environment, wherein the map comprises a last detection time of each marker of the plurality of markers;

receiving a set of detected markers from a robotic device that is configured to localize in the environment using the plurality of markers;

updating, in the map, the last detection time of each marker which has a mapped position that corresponds to a detected position of a detected marker in the set of detected markers;

identifying, from the plurality of markers in the map, a marker having a last detection time older than a threshold amount of time;

responsive to identifying the marker having the last detection time older than the threshold amount of time:

determining a level of robot activity of a plurality of robotic devices since the last detection time of the identified marker, wherein the level of robot activity is determined for an area within the environment such that the area within the environment is proximate to a mapped location of the identified marker;

verifying that the determined level of robot activity indicates that at least a certain number of the plurality of robotic devices have traversed the area within the environment since the last detection time of the marker and thereby is sufficient to justify removal of the identified marker from the map; and based on verifying that the determined level of robot activity indicates that at least the certain number of the plurality of robotic devices have traversed the area within the environment since the last detection time of the marker and thereby is sufficient to justify removal of the identified marker from the map, removing the marker having the last detection time older than the threshold amount of time from the map; and after removing the marker from the map, causing one or more robotic devices to navigate within the environment based on the map.

* * * * *